United States Patent [19]

Watabe et al.

[11] Patent Number: 5,418,932
[45] Date of Patent: May 23, 1995

[54] GENERATION OF WIDTH MODULATED PULSES BY RELATIVELY ADJUSTING RISING AND FALLING EDGES UPON COMPARISON OF COUNTER WITH PROGRAMMABLY STORED VALUES

[75] Inventors: Mitsuru Watabe, Katsuta; Sanshiro Obara, Ibaraki; Rika Oue, Mito; Shigeki Morinaga, Hitachi, all of Japan

[73] Assignee: Hitachi, Ltd., Tokyo, Japan

[21] Appl. No.: 649,861

[22] Filed: Feb. 1, 1991

[30] Foreign Application Priority Data

Feb. 1, 1990 [JP] Japan .................................. 2-23455
Feb. 1, 1990 [JP] Japan .................................. 2-23456

[51] Int. Cl.$^6$ ............................................. H03K 3/017
[52] U.S. Cl. .................................... 395/550; 318/811; 363/41; 364/431.04; 364/474.12; 364/486; 327/172
[58] Field of Search ................... 395/550; 318/811; 363/41; 307/265; 364/474.12, 486, 431.04

[56] References Cited

U.S. PATENT DOCUMENTS

| | | | |
|---|---|---|---|
| 4,236,213 | 11/1980 | Richardson | 364/431.04 |
| 4,727,468 | 2/1988 | Maekawa | 363/41 |
| 4,860,186 | 8/1989 | Maekawa et al. | 363/41 |
| 4,930,100 | 5/1990 | Morinaga et al. | 395/275 |
| 4,965,504 | 10/1990 | Ueda et al. | 318/802 |
| 5,099,408 | 3/1992 | Chen et al. | 363/41 |
| 5,184,310 | 2/1993 | Takenouchi | 364/550 |

OTHER PUBLICATIONS

Morinaga, S. "Microprocessor Control System with I/O Processing Unit LSI for Motor Drive PWM Inverter" IEEE Transactions on Industry Applications vol. 1A-20 No. 6, pp. 1547-1553 1984.

*Primary Examiner*—Ken S. Kim
*Attorney, Agent, or Firm*—Antonelli, Terry, Stout & Kraus

[57] ABSTRACT

A pulse generating device according to the present invention is operated in accordance with a pulse control command including output time data about output pulse given from external equipment such as a CPU. The pulse control command including the output time data about the output pulses is transferred to a master memory of a contents addressable memory at an optional timing from outside. The contents of that master memory are copied to a slave memory in response to copy enable signals transmitted from a copy enable device. The copy enable signals are transmitted whenever a predetermined number synchronizing signals showing an end of the pulse period are generated from the interval timer. The contents addressable memory reads out the output control command of the output pulse from a slave memory when the timer value of the interval timer coincides with the time data of the slave memory. The output control circuit transmits output pulses which correspond to the control command read out as described above. As a result, if the output time data is reloaded at an optional timing from outside, the generation of an error in the pulse width of the output pulse can be prevented. Furthermore, the load of the CPU can be reduced.

33 Claims, 36 Drawing Sheets

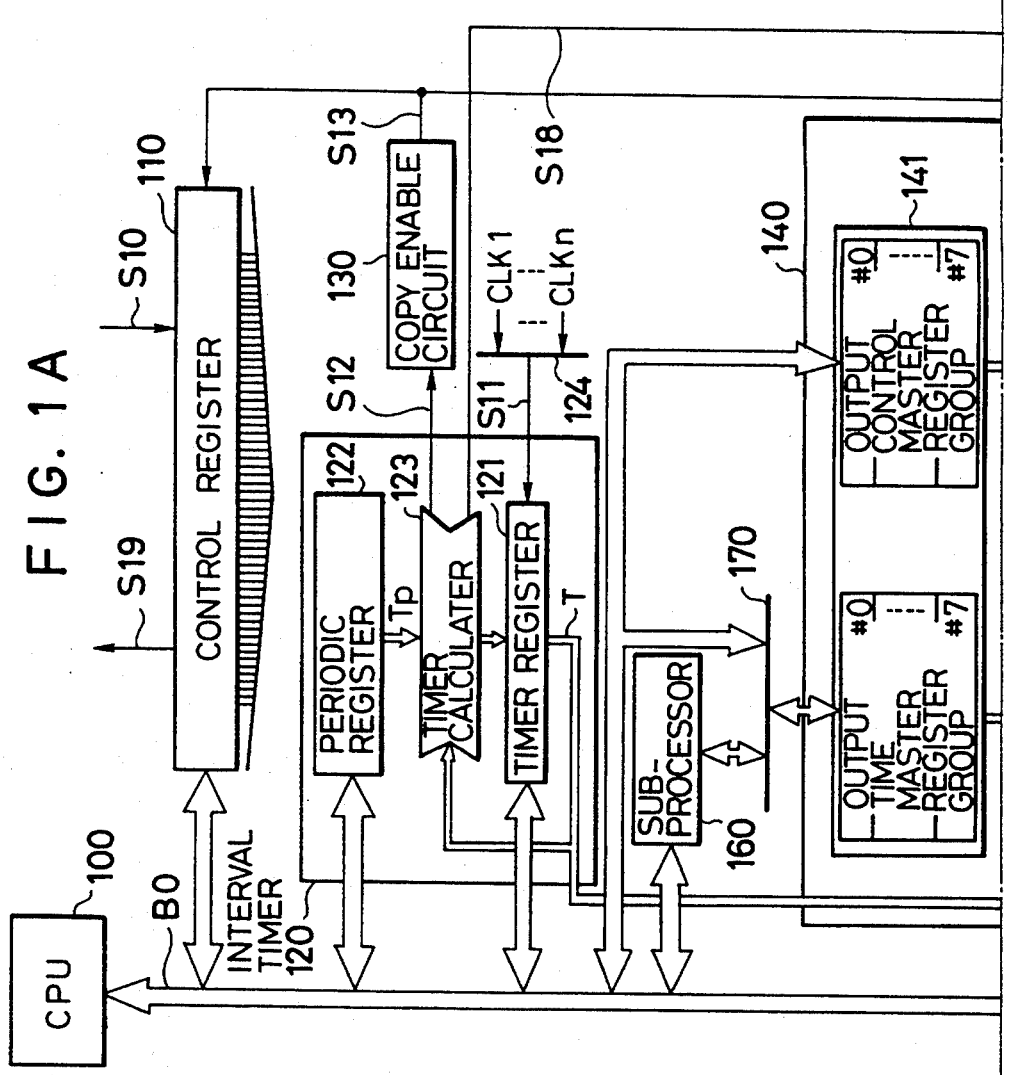

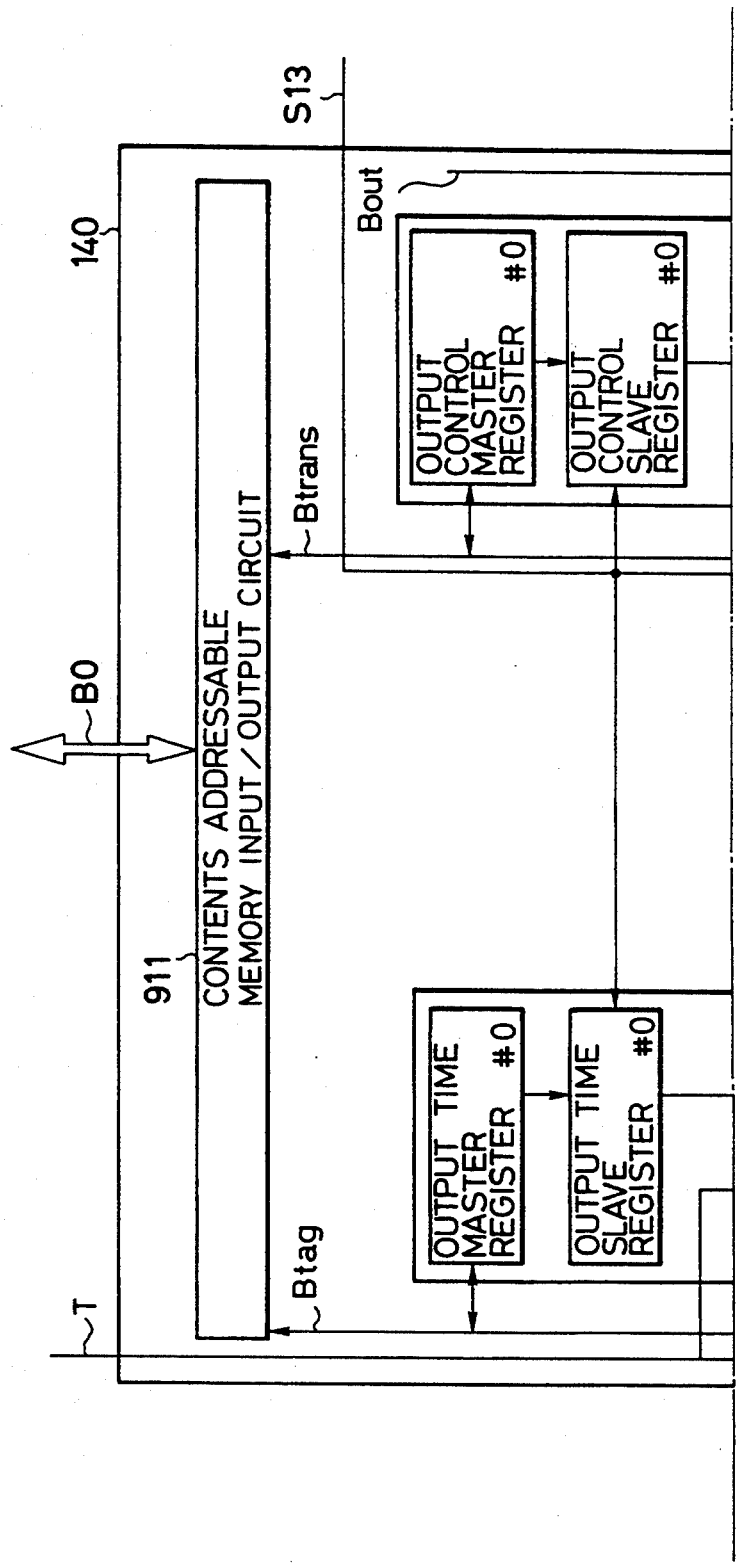

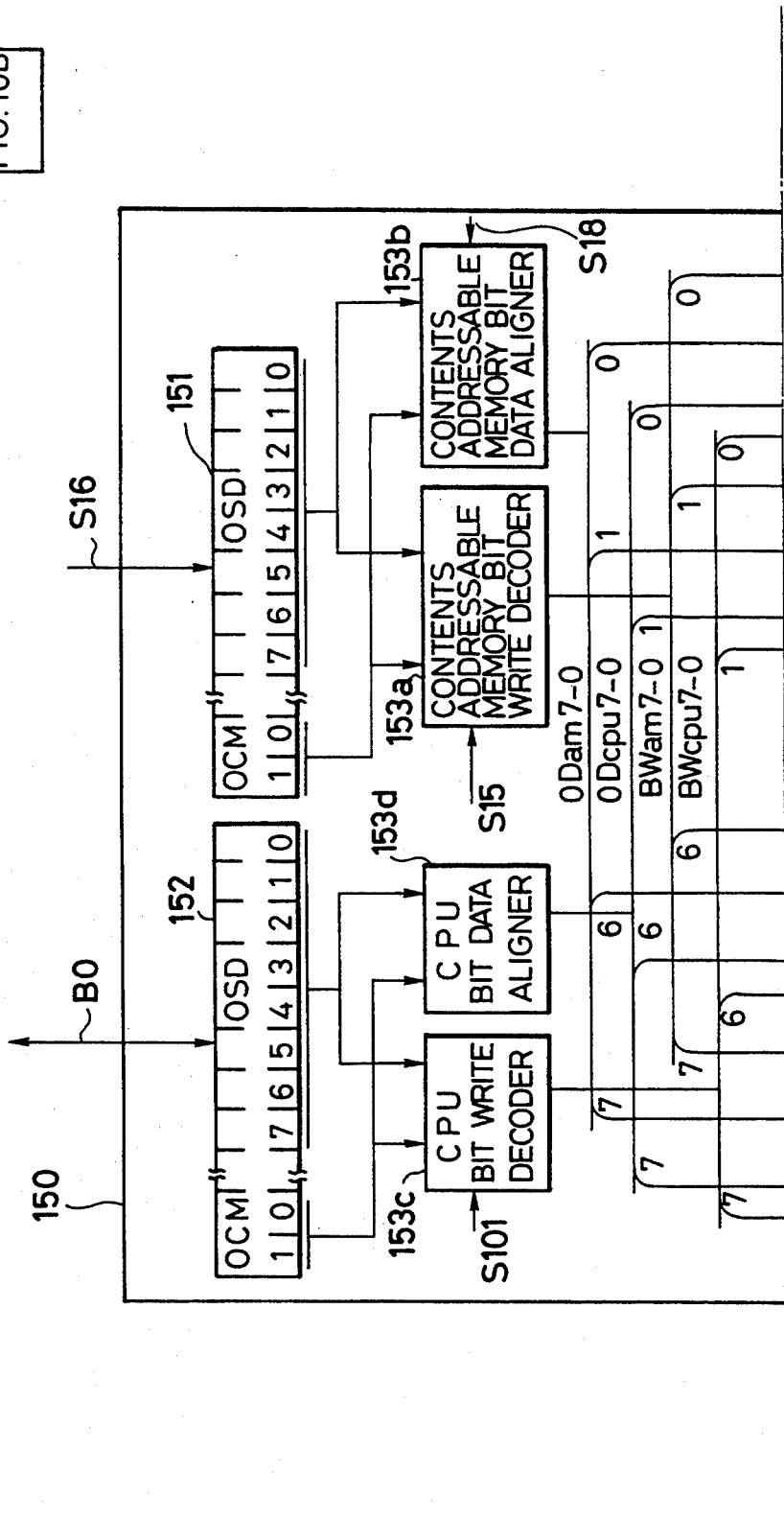

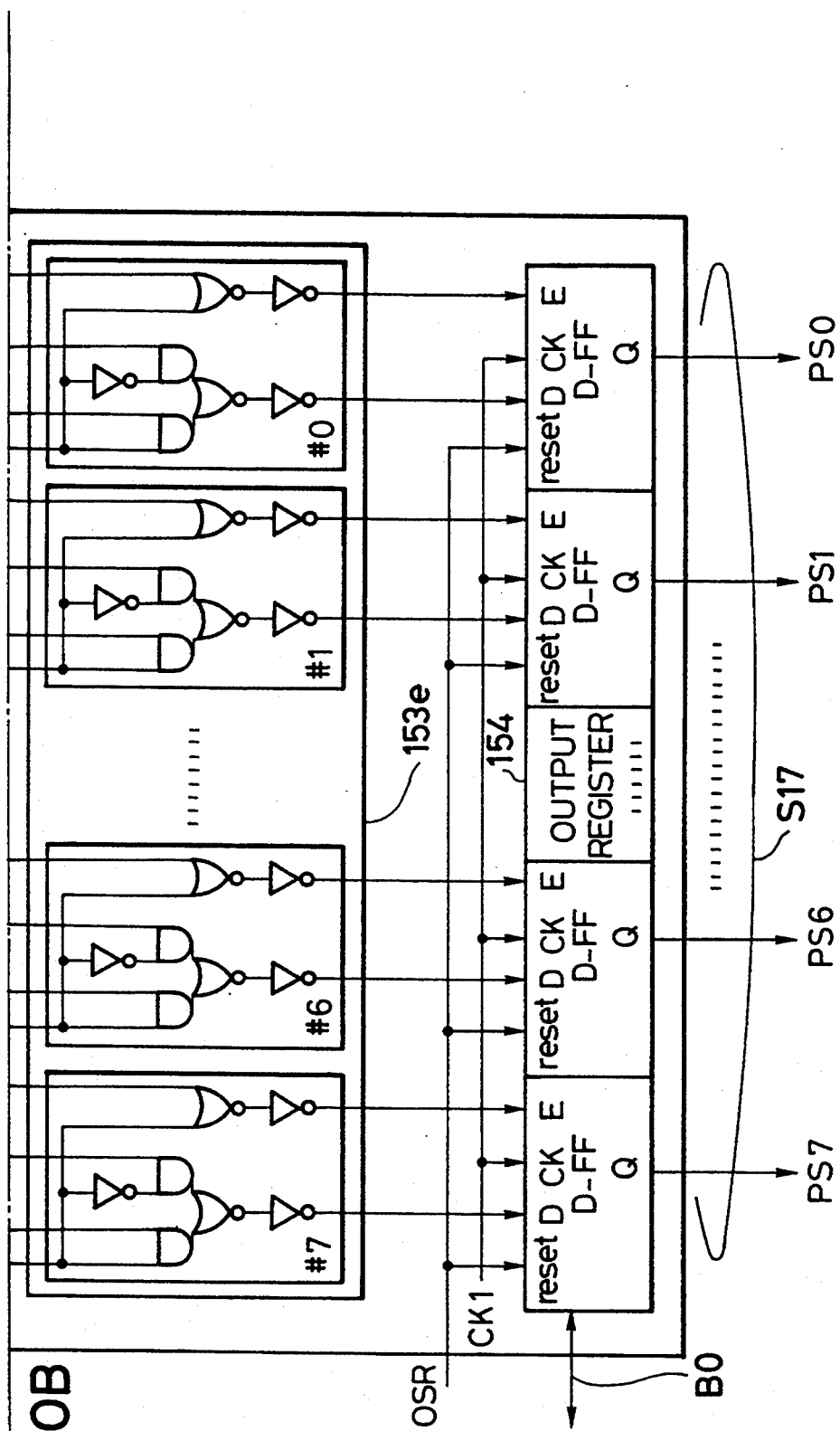
F I G. 10B

FIG. 11

| OUTPUT CONTROL COMMAND |||
|---|---|---|
| OUTPUT CONTROL MODE PORTION || OUTPUT SIGNAL DATA PORTION |
| (OCM1,OCM2) | OUTPUT SYSTEM | CONTENT |
| (0, 0) | 8-BIT PARALLEL OUTPUT | |
| (0, 1) | PARALLEL OUTPUT WITH 2SETS OF 3-BIT ENABLE | |
| (1, 0) | PARALLEL OUTPUT WITH 2SETS OF 2-BIT ENABLE | |
| (1, 1) | SINGLE OUTPUT WITH 1-BIT POSITION INSTRUCTION | |

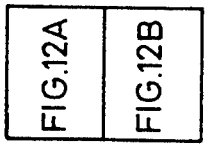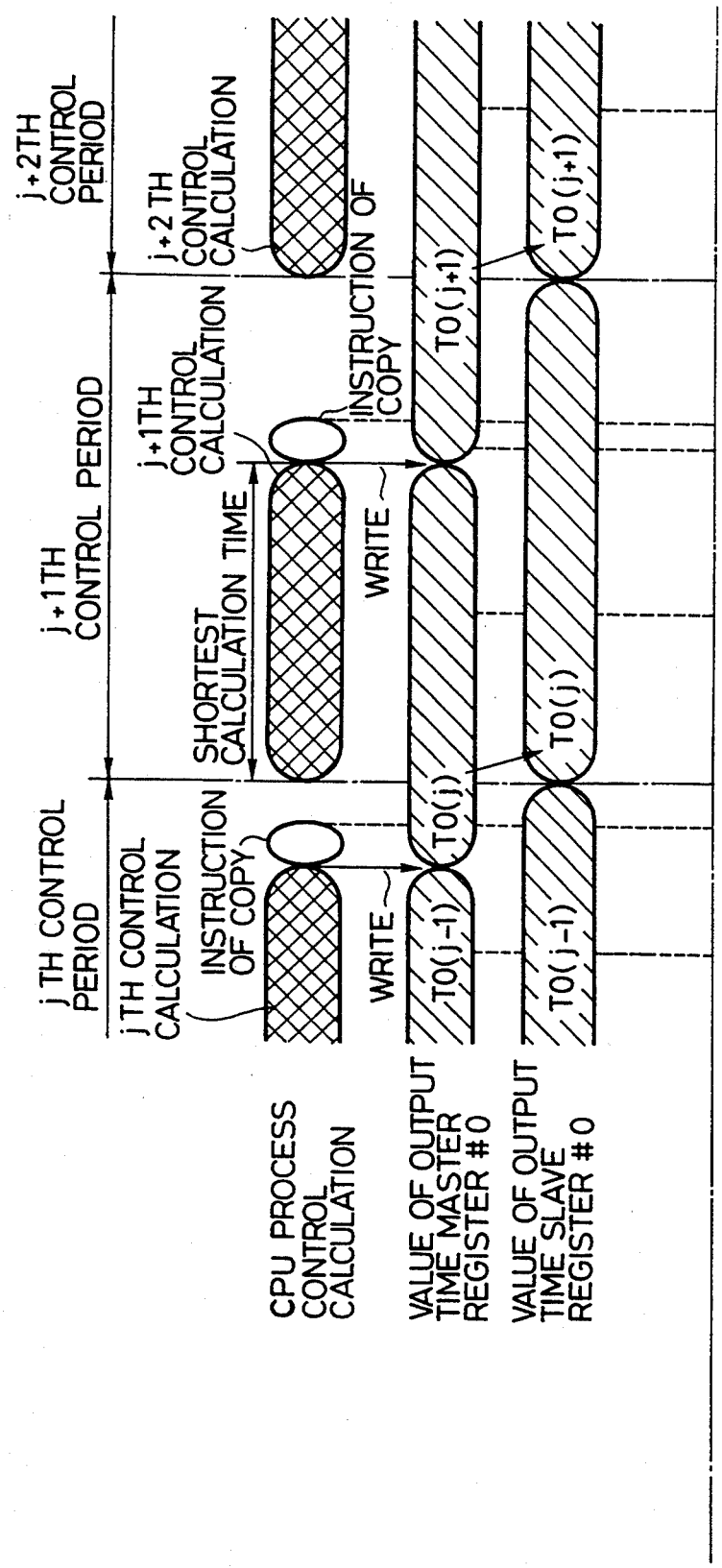

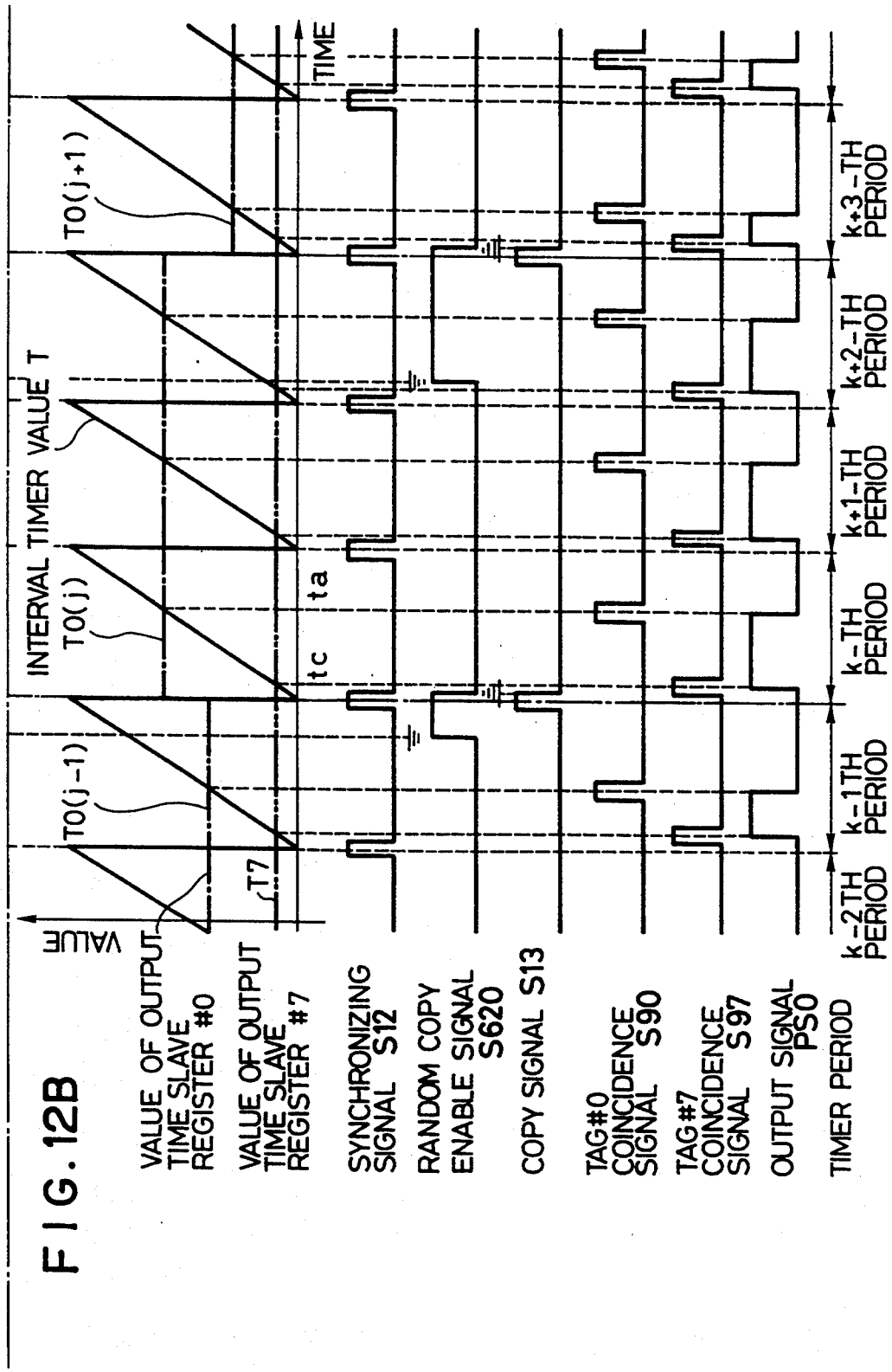

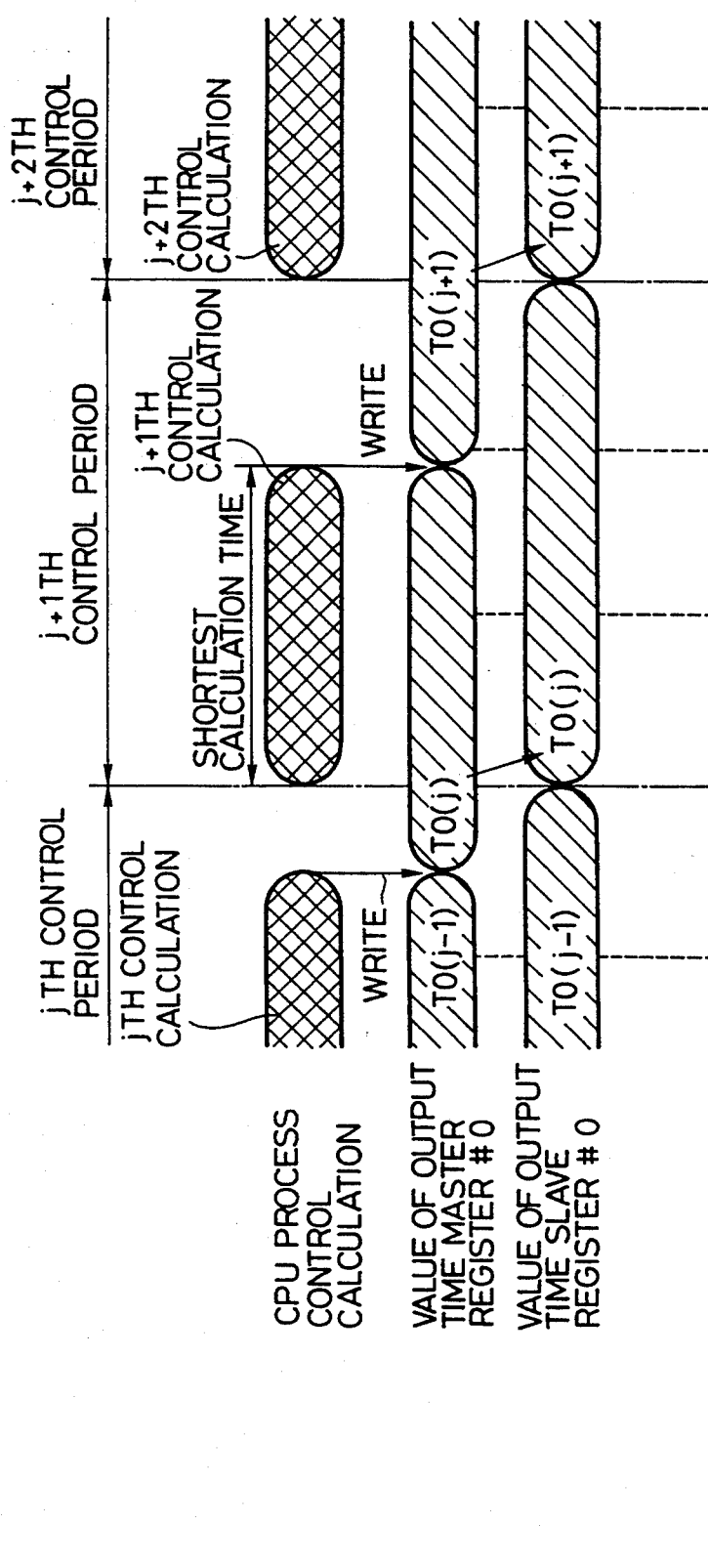

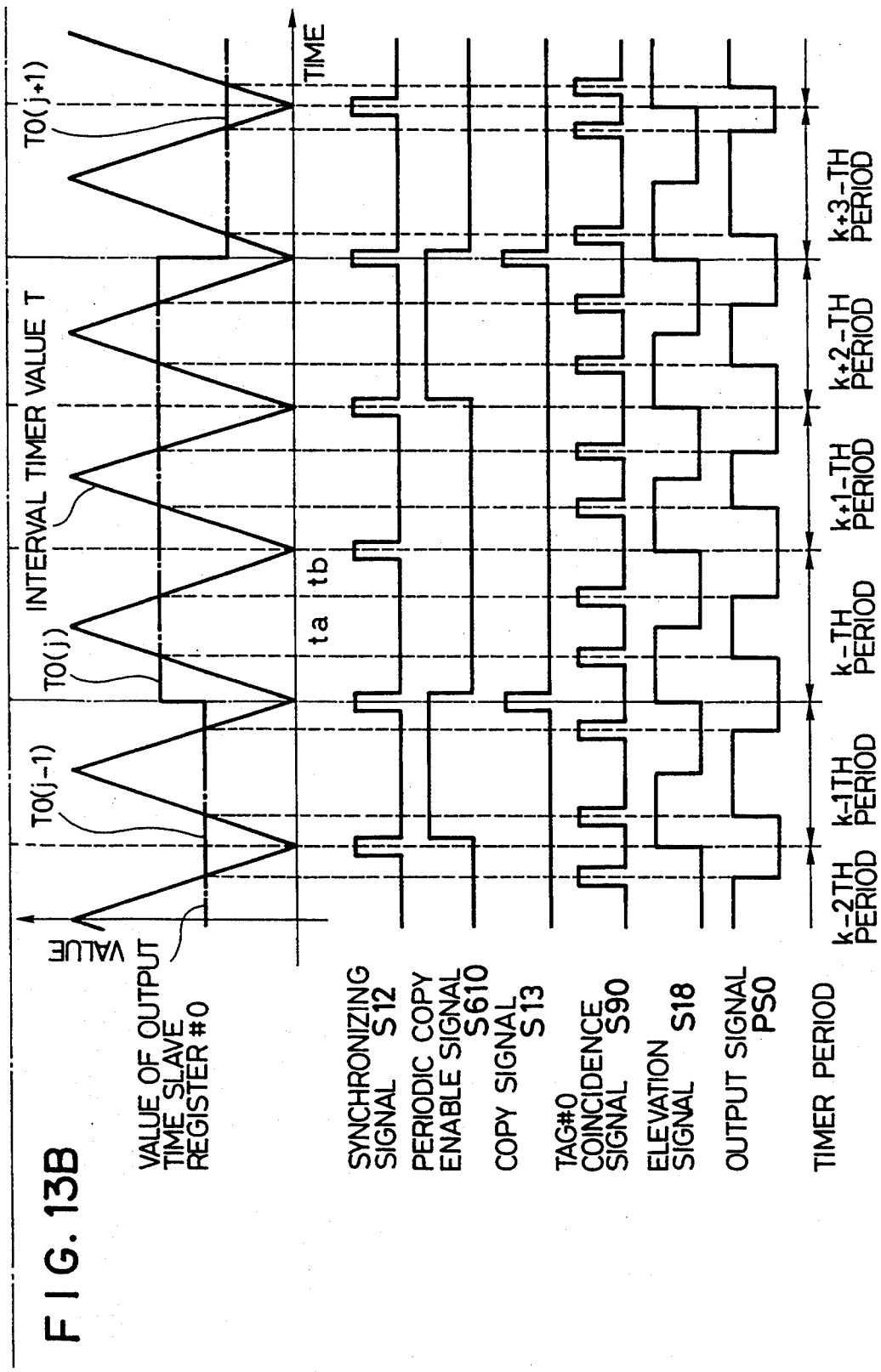

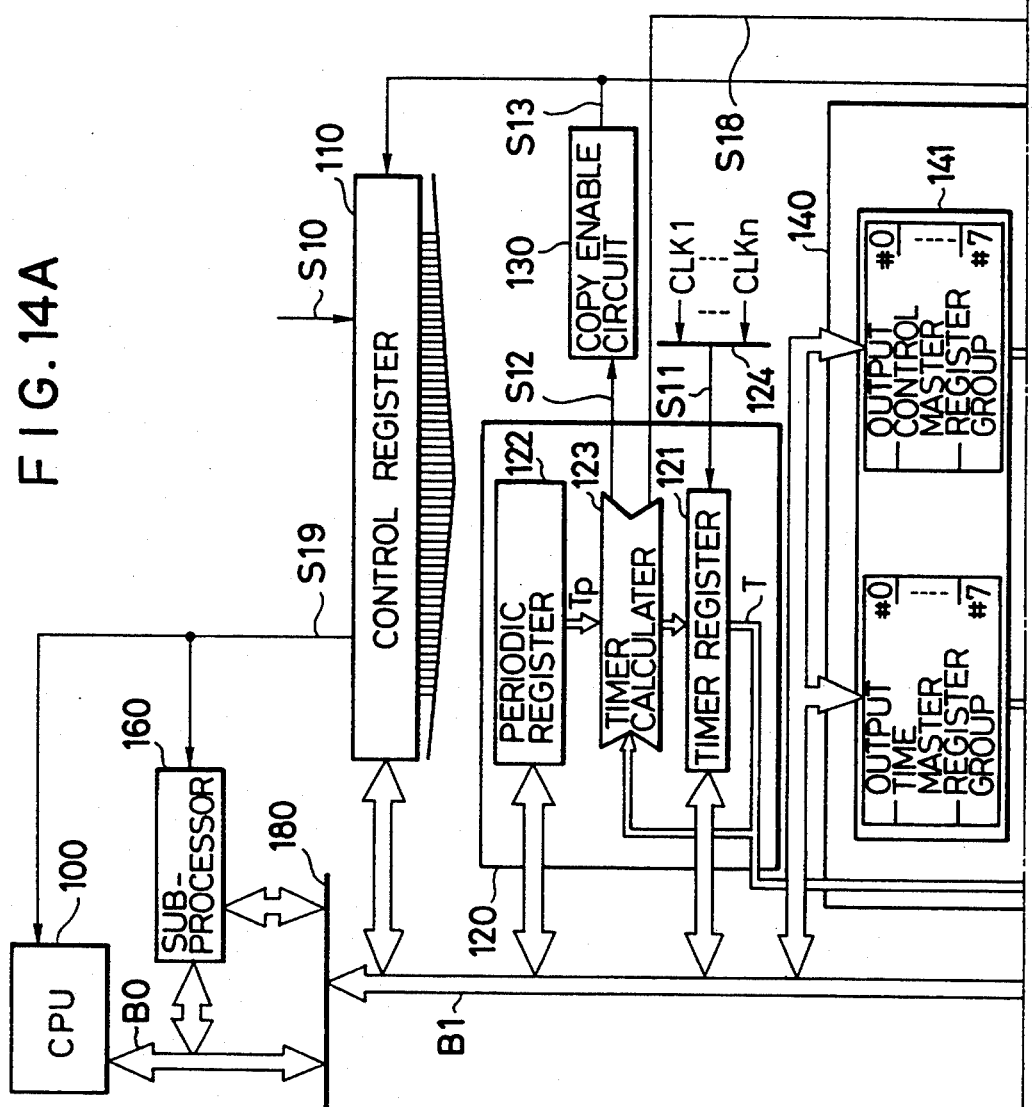

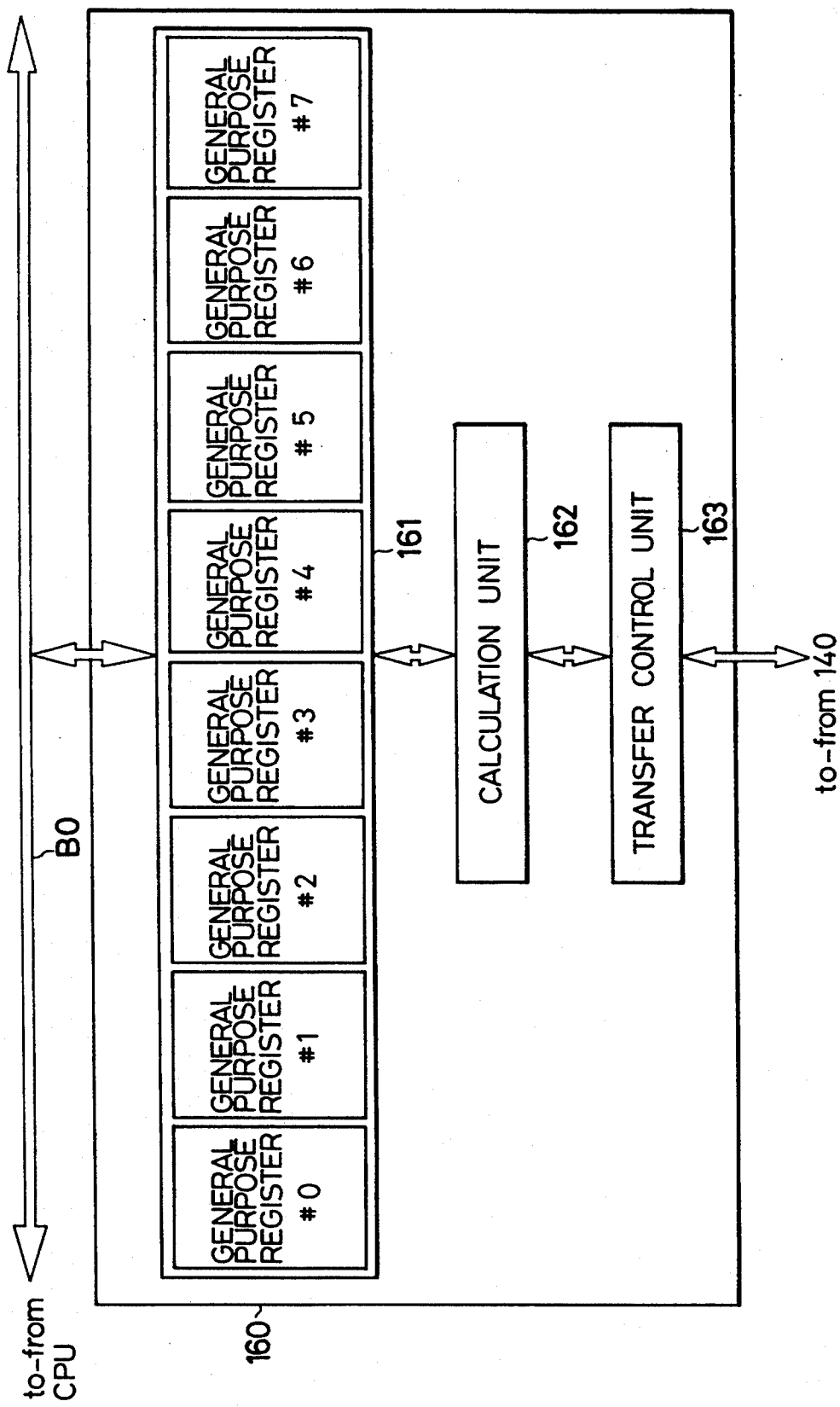

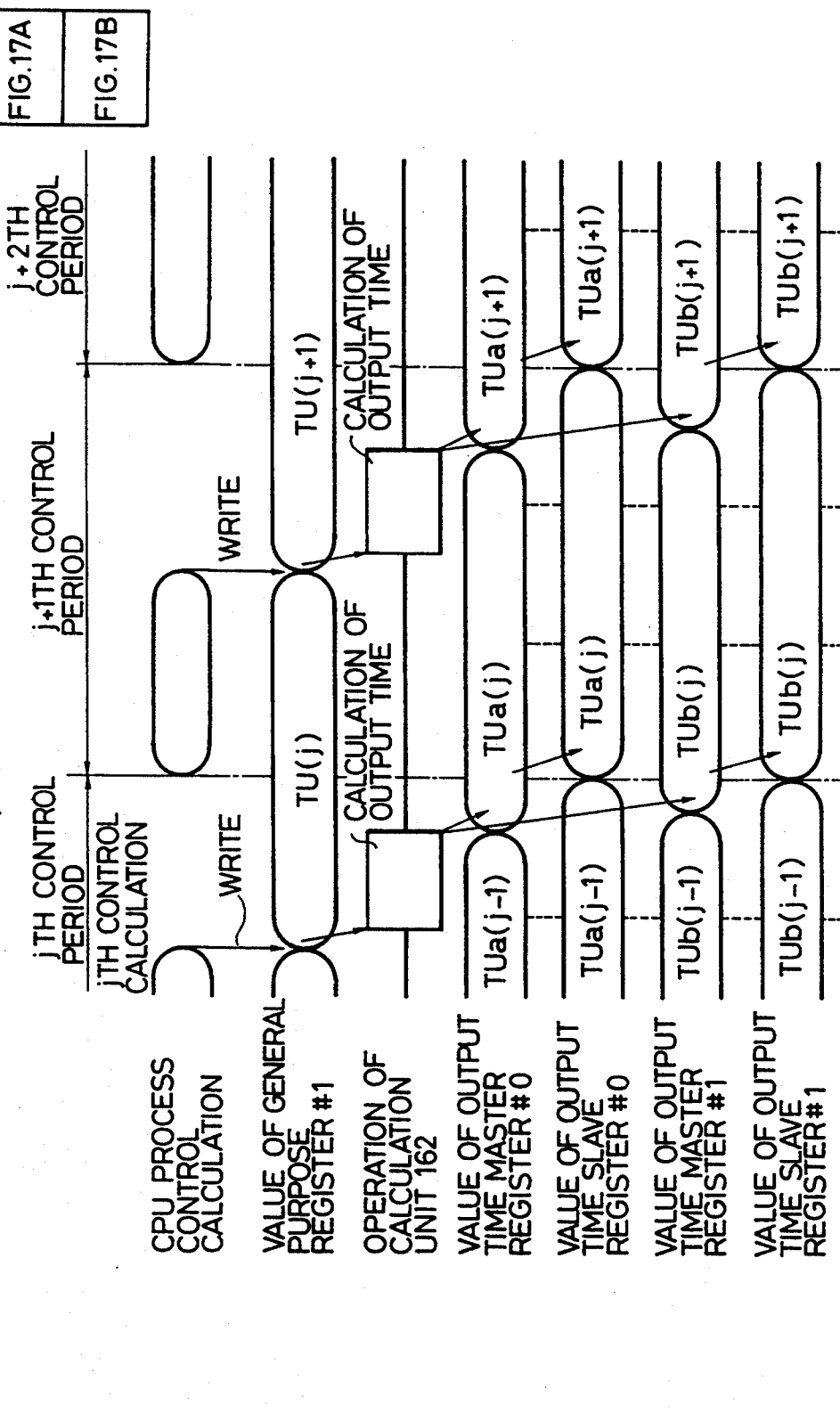

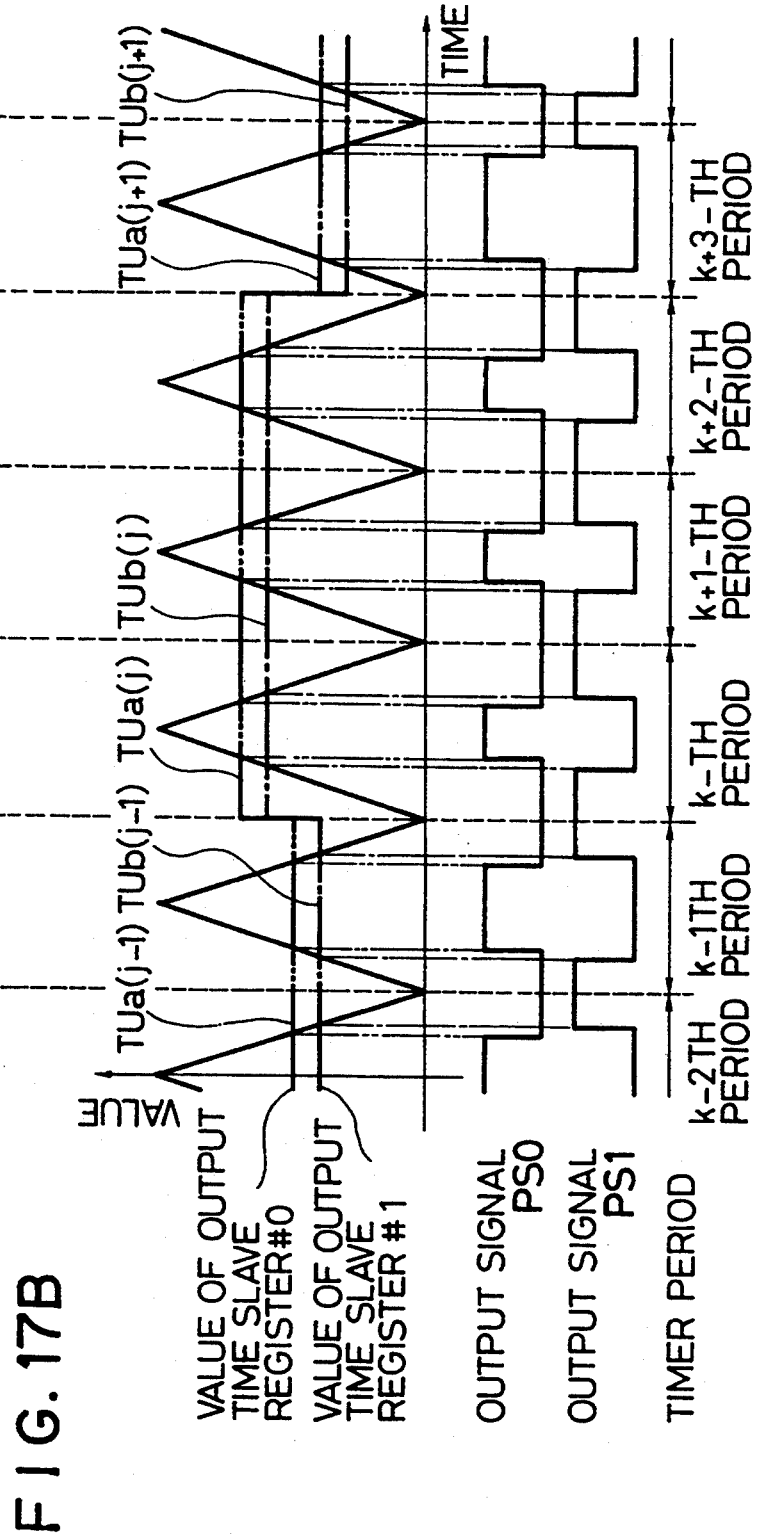

F I G. 25
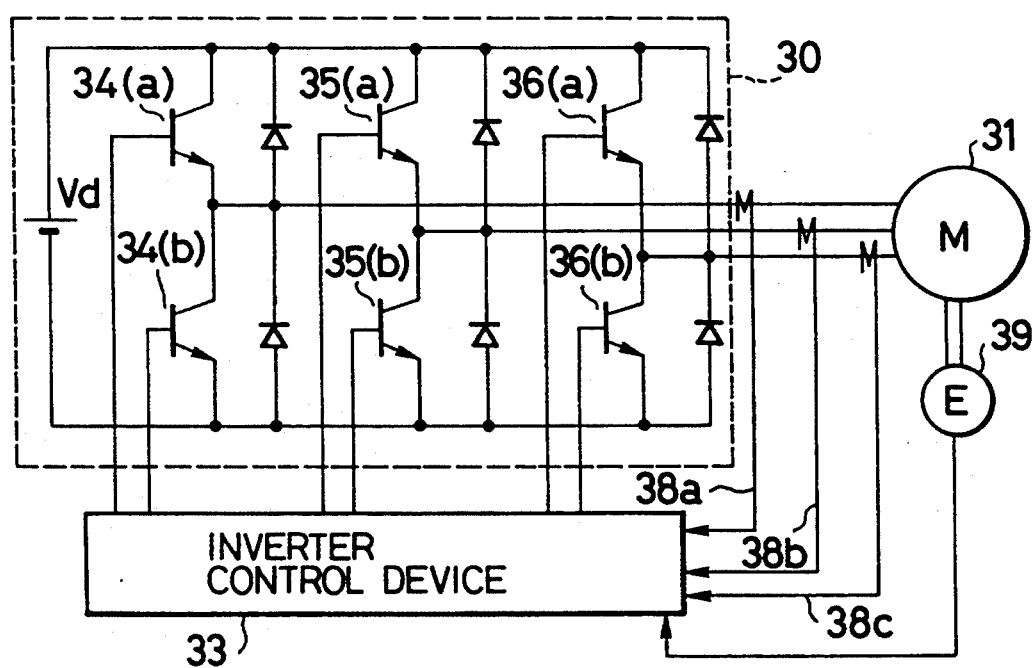

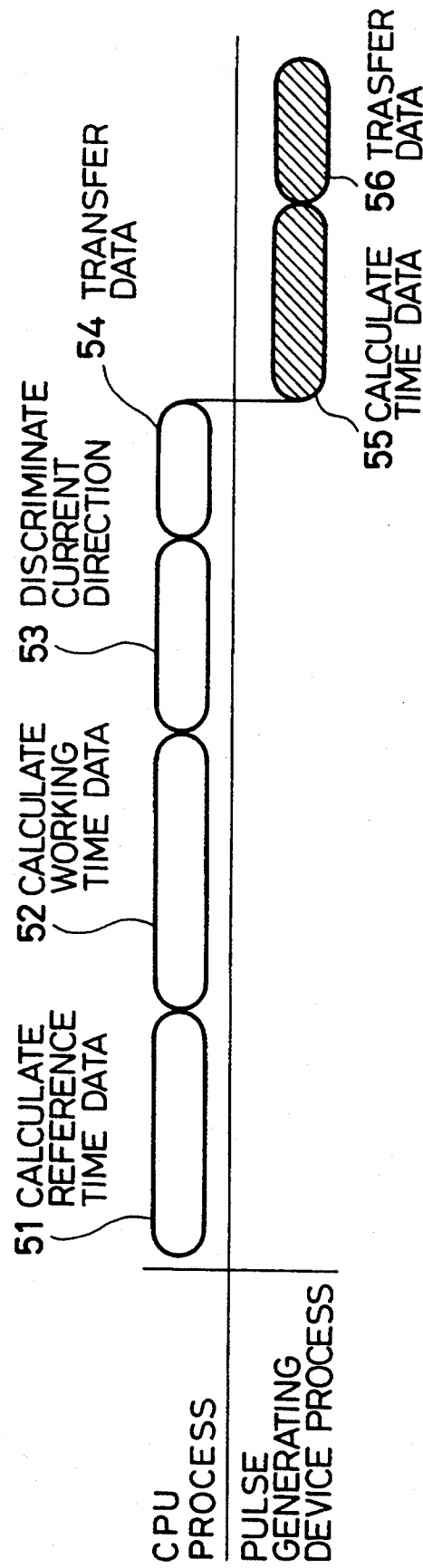

GENERATION OF WIDTH MODULATED PULSES BY RELATIVELY ADJUSTING RISING AND FALLING EDGES UPON COMPARISON OF COUNTER WITH PROGRAMMABLY STORED VALUES

BACKGROUND OF THE INVENTION

1. Field of the Invention

The present invention relates to a pulse generating device, and, more particularly, to a pulse generating device capable of generating a pulse signal for driving a power switch device in accordance with pulse generation data or the like transmitted from a CPU, to a microcomputer employing the above-described pulse generating device and to a contents addressable memory for use in the above-described devices.

2. Description of the Related Art

A PWM (Pulse Width Modulation) pulse generating device has been used to control voltage to be applied to a variety of devices. For example, it acts as a device for converting supplied voltage data, which has been calculated by a CPU, into a signal for driving a power switch device of a PWM inverter.

Conventional devices of the type described above have been disclosed in Japanese Patent Laid-Open No. 59-113792, Japanese Patent Laid-Open No. 61-116994, Japanese Patent Publication No. 60-2510, Japanese Patent Publication No. 63-18018 and Japanese Patent Laid-Open No. 62-163579. Furthermore, a device is known which is included in a microcomputer (Product No. i8096) manufactured by Inkel, U.S.A. and another device included in a microcomputer (Product No. HD6475328) manufactured by Hitachi.

According to the above-described conventional technology, there has been a PWM pulse generating device having a plurality of interval timers and a plurality of registers. The PWM pulse generating device acts to compare time data which defines the pulse width set to each of the registers with the value of the interval timer so as to change the binary status of the corresponding PWM pulse at timing at which they coincide with each other. Another PWM pulse generating device has been known which comprises a contents addressable memory which is structured in such a manner that the time at which the binary status of the free-run timer is changed is arranged to be a tag, the binary status after the above-described change is arranged to be data and the value of the free-run timer is arranged to serve as a retrieval key. According to this technology, the value of the free-run timer and all of the tags are subjected to comparisons in the contents addressable memory. Then, data corresponding to the coincident tags is arranged to be transmitted.

However, there arises a problem in that an error takes place in the pulse width due to the timing at which the value of the register, which defines the width of the PWM pulse, is reloaded. What is even worse, an excessively large load is applied to the CPU since writing to the register must be performed whenever the time data or the like of the PWM pulse is changed.

A device using the free-run timer must be arranged in such a manner that the first transition time of the PWM pulse and the last transition time of the same are instructed at each period of the PWM carrier. Since the time instruction of the type described above enlarges the load to be applied to the CPU, the throughput in the calculation process performed by the CPU is deteriorated. For example, at least 24 data items must be generated and transferred in a bridge type three-phase inverter for controlling the rotation of an electric motor since gate pulses for switching devices for phase U, phase V and phase W×6 arms must be generated.

The upper arm and the lower arm of the bridge structure which are complementarily turned on/off. In order to prevent a short cut of the upper arm and the lower arm, a pair of gate pulses which correspond to the upper arm and the lower arm respectively have a dead time in which both of the arms are turned off.

However, since the above-described conventional technology has no means to reduce the number of data items to be transferred at the time of generating the pulses, a problem arises in that an excessively large load can be applied to the CPU at the time of the data transference. In particular, if a carrier wave having higher frequency is desired in the pulse width modulation (PWM) control operation, an excessively large load is applied at the transference process.

Similarly, another problem arises in the process of calculating the above-described dead time that the load to be applied to the CPU becomes too large when higher frequency wave is obtained.

It might therefore be feasible to employ a method in which an interval timer is used as an alternative to the free-run timer and the necessity of time instruction is eliminated in a period in which the PWM signal has a predetermined waveform. However, in a case where the value of the tag has been reloaded to a value which is smaller than the value of the interval timer, the tag and the retrieval key cannot coincide with each other in the PWM period in which the value is reloaded, causing a fear to be arisen in that an error can be generated in the pulse width.

SUMMARY OF THE INVENTION

An object of the present invention is to provide a microcomputer having a pulse generating device capable of preventing an error in the pulse width taken place due to the fact that pulse width data or the like is reloaded.

A further object of the present invention is to provide a contents addressable memory capable of realizing a stable contents addressable operation even if the tag is reloaded.

A still further object of the present invention is to provide a pulse generating device capable of reducing the number of data items which are necessary to generate a pair of pulses, of each of which having a predetermined correlation, and reducing the load applied to the upper CPU by performing a calculation to control the timing relationship (for example, the dead time) between the first transition points of the pulses or the last transition points of the same.

In order to achieve the above-described objects, an aspect of the present invention lies in a pulse generating device comprising: a CPU (Central Processing Unit) for calculating an output control command for defining the binary status of an output pulse and a pulse control command containing timing data for defining the change timing of the binary status; an interval timer for starting its operation in accordance with an operation start command supplied from the CPU, generating a predetermined pattern timer value which is successively changed in accordance with a timer period defined by the control command supplied from the CPU and in synchronization with a clock signal, transmitting synchronizing signals whenever the timer value coincides with a value showing an end of the timer period and resetting the timer value; copy enable means for receiving the synchronizing signals transmitted from the interval timer and transmitting a copy signal in response to a predetermined one of the synchronizing signals; a contents addressable memory having an output time master memory for storing the time data about an output pulse transferred from the CPU, an output time slave memory for copying and storing the time data of the output time master memory in response to the copy signal, a comparator for comparing the time data of the output time master memory or the output time slave memory with the timer value of the timer register in accordance with an instruction of a memory to be compared and supplied from the CPU and for transmitting a coincidence signal when their values coincide with each other, an output control master memory for storing an output control command which defines the binary status of the output pulse supplied from the CPU and an output control slave memory for copying and storing the output control command from the output control master memory in response to the copy signal so as to transmit a corresponding output control command of the output control master memory or the output control slave memory in synchronization with the coincidence signal transmitted from the comparator; and an output control circuit for receiving the output control command transmitted from the contents addressable memory and transmitting an output pulse which corresponds to the output control command.

The copy enable means can be arranged to generate the copy signal whenever the synchronizing signals are supplied a predetermined number of times. Furthermore, the copy enable means can be arranged to correspond to the copy signal supplied from the CPU and generate the copy signal in synchronization with the synchronizing signal supplied immediately after the copy command has been supplied.

The contents addressable memory can be arranged to have a plurality of the output time master memories, the output time slave memories and the comparators, one of the plurality of output time master memories, output time slave memories and comparators are respectively collected to constitute a plurality of tag word cells, the contents addressable memory further has a plurality of the output control master memories and the output control slave memories, one of the plurality of output control master memories and output control slave memories are respectively collected to constitute a plurality of output data word cells and each of the tag word cells and the output data word cells are provided to correspond to one another.

Each of the comparators of the contents addressable memory can be arranged in parallel to compare each of the output time master memories or each of the output time slave memories with the timer value in accordance with a given parallel comparison command, and to successively compare a specific output time master memory or a specific output time slave memory with the timer value in accordance with a given successive comparison command.

The interval timer can be arranged to include a timer register for storing the timer value and a periodic register for storing a maximum timer value for specifying the period of the output pulse, the timer calculating means including an adder for fetching the timer value of the timer register and for adding a unit quantity of 1 to the timer value so as to transfer it to the timer register, a comparator for comparing the value of the timer register and that of the periodic register so as to transmit a coincidence signal when they coincide with each other, a clear circuit for receiving the coincidence signal so as to clear the adder and a synchronizing signal generating circuit for generating a synchronizing signal in synchronization with the clock signal proviso that the coincidence signal has been generated.

A structure can be realized in which a CPU (Central Processing Unit) is connected to the above-described pulse generating device so that the CPU calculates an output control command which defines the binary status or the like of the above-described output pulse and a pulse control command including time data which defines the timing change of the binary status. The thus calculated pulse control command is transferred to the above-described interval timer, the copy enable means and the contents addressable memory. Furthermore, a sub-processor can be connected, as well as the CPU, so as to perform a portion of the calculation to be performed by the CPU, for example, the calculation of the time data which defines the timing change of the binary status of the output pulse and the transference operation to the register.

According to the thus structured pulse generating device according to the present invention, the contents of each of the master memories are copied to each of the slave memories whenever the synchronizing signals are generated a predetermined number of times. Since the timing of the above-described copying operation is defined in response to the synchronizing signal which shows the fact that the value of the interval timer has become the final value, generation of an error in the pulse width or the output taken place due to the reloading timing of the pulse output time data can be prevented.

Furthermore, since the memory to which the pulse control data, such as time, and the memory for use in the data comparison operation are individually provided, a stable contents addressable operation can be performed by using the tag for the status before the reloading if the tag is being reloaded. In addition, since the memory for the tag and the comparator are integrally formed and the memory for the contents addressable operation is integrally formed as will, the length of the wiring can be shortened and the area of the chip can thereby be reduced.

When the above-described contents addressable memory is further arranged in such a manner that the contents of the interval timer and the output time master memory or the output time slave memory are successively subjected to a comparison, the output data corresponding to each of the tags can sequentially be read out even if the same tag is written to a plurality of tags. As a result, a pulse signal having a desired waveform can be obtained if the change time of a plurality of the pulse signals scatters for each signal.

According to the above-described interval timer, the carrier can be selected from a triangular waveform carrier and a sawtooth carrier in accordance with the method of modulating the pulse signal.

The second object of the present invention can be realized by the contents addressable memory constituted as described above.

In order to achieve the third object of the present invention, another aspect of the present invention lies in a pulse generating device comprising: a reference time data register for storing reference time data for defining the timing axis of a pair of pulses to be generated; first and second working time data registers for respectively storing working time data showing the timing relationship of each of the pulses with respect the reference time data; first and second pulse output registers for respectively storing status data instructing the binary status of either pulse of the pair of pulses; a control register for storing a control signal; a counter for counting clock pulses; a calculation unit for fetching the reference time data and each of the working time data to arithmetically obtain time data about the first transition of each of the pulses and the last transition of the same; a transfer control unit for controlling transference timing of the time data of each of the pulses obtained in the calculation unit; first and second time data registers for respectively storing the time data of each of the pulses transmitted from the transfer control unit; and first and second comparators for respectively comparing the time data of each of the time data registers with the value of the counter so as to transmit a coincidence signal when they coincide with each other, wherein the calculation unit performs a calculation defined in response to a calculation control signal stored in the control register. The transfer control unit controls the transference timing of each of the time data in response to a transfer control signal stored in the control register. The first pulse output register has an output terminal which is reset to a binary status realized by inverting the stored status data and the second pulse output register has an output terminal which is reset to a binary status of the stored status data. The first and second pulse output registers respectively invert the binary status of the output terminal when one coincidence signal is supplied from corresponding comparator and reset the binary status of the output terminal when next coincidence signal is supplied. The counter is reset in response to a reset signal periodically stored in the control register and the reference time data, each of the working time data, the status data and the control signal are supplied from outside in accordance with the transference period of a countup reset signal of the counter.

Furthermore, when the structure is arranged in such a manner that the working time data about either of the pulses is caused to coincide with the above-described reference time data, the reference time data register or the first working time data can be omitted from the structure and the number of data items to be transferred can be reduced by one.

It is preferable that each of the pulse output registers has an inversion output terminal which is maintained at the inverted status of the above-described output terminal. In this case, if the structure is arranged in such a manner that output switches are provided which are capable of selecting the output terminal or the inversion output terminal of each of the above-described pulse output registers and each of the switches is controlled in response to an output switch control signal to be stored in the above-described control register, the polarity of the generated pulse is able to reveal the general purpose probability.

The above-described counter may comprise an ordinary free-run counter or an up/down counter. In this case, the contents of the calculation performed by the calculation unit and the control signal are determined in accordance with the type of the employed counter.

Since the structure of the pulse generating device according to the present invention is arranged as described above, the third object of the present invention can be achieved due to the following effect.

That is, time data about the first transition point and the last transition point of a pair of pulses are obtained by the calculation unit by using one reference time data item and a pair of working time data items. The thus obtained data is stored in the pair of pulse output registers. When it has been determined by the comparator that the value of the counter coincides with the first transition time data, the output terminal of the first pulse output register is changed to a specified binary status (positive or negative) and is then reset when the counter coincides with the last transition time data. The output terminal of the second pulse output register is operated in a contrary manner. As a result, a pair of pulses of the pattern, which are suitable to operate the switching devices for the upper and the lower arms, which are operated complementarily, can be generated. As a result, the time data items to be transferred to the upper CPU can be reduced by one for a phase. Therefore, the load to be applied to the upper CPU at the time of the transference operation can be reduced. Furthermore, since the calculation to be performed by the upper CPU for the purpose of controlling the time difference between the pair of pulses can be eliminated, the load can be reduced.

If the structure is arranged to comprise the up/down counter, the first and last transition points of the pulse can be controlled by using only one time data item by performing the up-reset and the down-reset operations in accordance with the period of the PWM carrier wave. As a result, the calculation to be performed by the calculation unit can be reduced.

Other and further objects, features and advantages of the invention will be appear more fully from the following description.

BRIEF DESCRIPTION OF THE DRAWINGS

FIGS. 1, 1A, and 1B together illustrate an overall structural view which illustrates an embodiment of the present invention;

FIGS. 9, 9A, and 9B together illustrate a block diagram which illustrates the structure of a parallel comparison type contents addressable memory;

FIGS. 10, 10A, and 10B together illustrate a block diagram which illustrates the structure of an output control circuit;

FIG. 11 illustrates the specific structure of an output control command;

FIGS. 12, 12A, and 12B together illustrate a timing chart for the generation of PWM pulses in a case where the sawtooth carrier is employed;

FIGS. 13, 13A, and 13B together illustrate a timing chart for the generation of PWM pulses in a case where the triangular waveform carrier is employed;

FIGS. 14, 14A, and 14B together illustrate an overall structural view which illustrates another embodiment of the present invention;

FIGS. 15 and 16 are each structural views which respectively illustrate sub-processors;

FIGS. 17, 17A, and 17B together illustrate an operation timing chart of the structure shown in FIG. 14 in which the sub-processor shown in FIG. 16 is employed;

FIG. 25 is a structural view which illustrates an embodiment of a microcomputer for controlling an electric motor according to the present invention;

FIG. 29 is a timing chart about the calculation performed by the CPU of the structure shown in FIG. 25.

DETAILED DESCRIPTION OF THE PREFERRED EMBODIMENTS

Figure 1B:
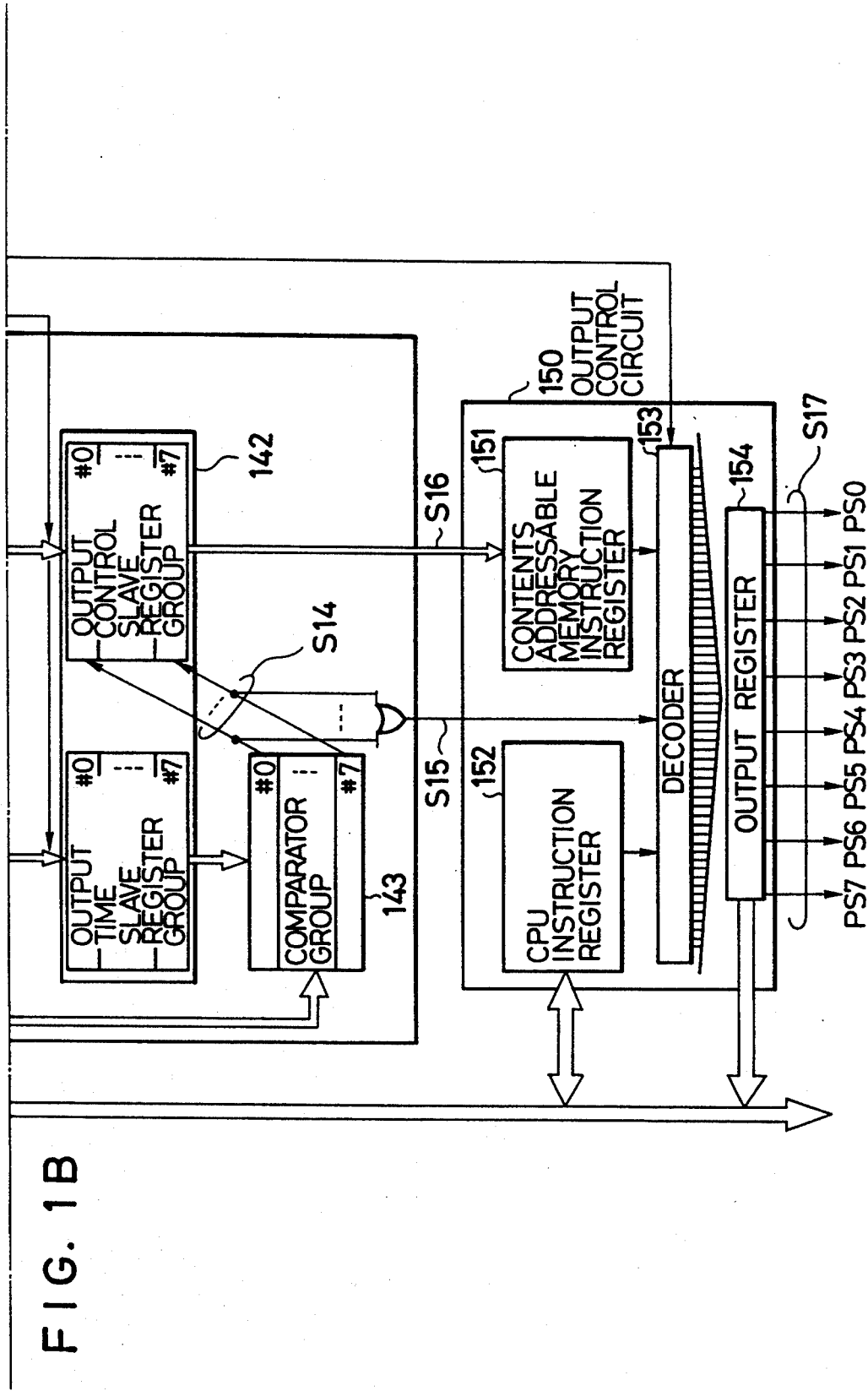

An embodiment of the present invention will now be described with reference to the drawings. FIG. 1 illustrates an essential portion of an embodiment of a microcomputer using a PWM pulse generating device according to the present invention. As shown in FIG. 1, the device according to this embodiment comprises a CPU 100, a control register 110, an interval timer 120, a copy enable circuit 130, a parallel comparison type contents addressable memory 140, an output control circuit 150 and a sub-processor 160. Each elements of the control register 110 or the like is connected to the CPU 100 via a system bus BO. The CPU 100 is a calculation command means for transmitting a command which is necessary to generate the PWM signal by performing various calculation processes. The various commands generated by the CPU 100 are transmitted to the control register 100 and the sub-processor 160 and the like.

The control register 110 has a region of 16 bits respectively allocated as shown in Table 1 and storing corresponding information items.

TABLE 1

| Name of Bit | Control Register Bit No. | Contents |
| --- | --- | --- |
| IRS (Interrupt Request Status) | 15 | Interruption request status: "1": request, "0": no request |
| IRE (Interrupt Request Enable) | 14 | Interruption request is enabled. When IRS · IRE = 1, interruption signal for |

TABLE 1-continued

| Name of Bit | Control Register Bit No. | Contents |
| --- | --- | --- |
| STR (start) | 13 | CPU is generated Operation of interval timer is started |
| CWS (Carrier Wave Select) | 12 | Shape of the changed interval timer value is specified. "1": triangular wave, "0": sawtooth wave |
| — | 11 | Reserved |
| CSS2 (Clock Source Select 2) | 10 | |
| CSS1 (Clock source Select 1) | 9 | Clock source of Interval Timer is selected |
| CSS0 (Clock Source Select 0) | 8 | |
| SPE (SubProcessor Enable) | 7 | Operation of sub-processor is enabled. "1": enable "0": prohibited. |
| PCE2 (Periodical Copy Enable 2) | 6 | Period of periodical copy from master memory to slave memory is specified. |
| PCE1 (Periodical Copy Enable 1) | 5 | |
| PCE0 (Periodical Copy Enable 0) | 4 | |
| RCE (Random Copy Enable) | 3 | Random copy from master memory to slave memory is specified |
| CMM (Compare Master Memory) | 2 | Subject of comparison with interval time is specified. 1: Master memory, 0: slave memory |
| SCN (Scan) | 1 | Method of comparison is specified. 1: sequential scan, 0: parallel scan |
| OSR (Output Signal Reset) | 0 | Simultaneous reset of all of output signals is specified. 1: reset and output is stopped, 0: normal operation |

Next, the contents of the commands stored in the corresponding bits of the control register shown in Table 1 will be described. The interruption request status IRS is data showing whether or not a request for the interruption process is made to the CPU 100. The interruption request is set when a copy signal S13 is generated. The interruption request enable bit IRE stores an interruption signal S19 which makes a request to the CPU 100 with enable IRS.IRE-1 thereof when the interruption request status IRS is in request. The operation start bit STR stores a command to instruct the operation start of the PWM pulse generating device according to the present invention. The carrier wave selection bit CWS stores a command to select the carrier, which relates to generation of the PWM signal, from the triangular wave or sawtooth wave. A clock source selection portion CSS stores a command to select a timer clock S11 for the interval timer 120 from a plurality of clock signals having different periods. A sub-processor operation enable portion SPE stores a control command to cause the sub-processor 160 to execute output time data of the output pulse in place of the CPU 100. A periodical copy enable portion PCE stores a command to specify the period for copying data from the master memory 141 to the slave memory 142. The above-described copying period is set by the CPU 100 on the basis of, for example, a synchronizing signal S12 transmitted from the interval timer 120. Data N for generating the copying signal S13 is stored whenever the synchronizing signals S12 are transmitted N (N is a natural number) times. A random copy enable portion RCE stores a command to cause the CPU 100 to permit the random copy individually from the above-described periodical copy. When that command is issued, the copying signal S13 is generated in synchronization with the ensuing synchronizing signal S12. The mask memory comparison bit CMM stores a command to specify the memory to be subjected to a comparison with the interval timer 120. When the above-described command is "1", the master memory is selected When the same is "0", the slave memory is selected. As a result, the two-layer memory structure of the parallel comparison type contents addressable memory 140 can equivalently be made to be a single layer. The scan bit SCN stores a command to specify the method of the comparison made between the interval timer 120 and the parallel comparison type contents addressable memory 140. When the above-described command is "1", the comparison is sequentially executed. When the same is "0", the parallel comparison is made. The output signal reset bit OSR stores a command to reset the output signal. When the above-described command is "1", the outputs of all of the signals in an output signal group S17 are prohibited. When the same is "0", a usual output is made.

A fact that the contents of the operation start bit STR is "1" means the operation. Furthermore, a fact that the same is "0" means the operation stops. The pre-operation status of the PWM pulse generating device according to the present invention is defined in accordance with the contents of the operation start signal STR. The interval timer 120 stops updating the contents of the timer register 121 and stops the time counting operation before the operation start signal STR is supplied. When the STR is supplied, the interval timer 120 starts its operation in accordance with the result of the time count written by the CPU 100. When the operation has not been started since the start signal STR has not been supplied to the copy enable circuit 130, that is, when STR is "0", the copy enable circuit 130 makes the copy signal S13 to be "1" so as to perform initialization while allowing the contents of the master memory 141 and the slave memory 142 to coincide with each other. As a result, a desired contents-addressable operation can be performed in accordance with the operation start time. When the operation start signal STR is supplied to the output control circuit 150, the supply of the write signal to the output register 154 is prohibited so that the updating of the contents of the output register 154 is prevented in accordance with an output control command issued from the parallel comparison type contents addressable memory 140 which has not been initialized by the CPU 100.

The setting and resetting of each of the bits of the control register 100 performed by the CPU 100 is executed by writing "1" or "0". However, the interruption request status IRS is set by the CPU 100 and the same is reset by the copy signal S13. The total resetting of the pulse generating device according to the present invention is performed in response to a total reset signal S10. In order to reduce the load to be applied to the CPU 100 and to eliminate the delay of the reset signal for the purpose of reliably performing the resetting operation, only the bits in the control register 110 are made to be "0" in response to the above-described total reset signal S10.

Then, the structure of each of the elements will be described. The interval timer 120 comprises a period register 122, a timer calculator 123 and a timer register 121. The interval timer 120 counts the timer clock S11 so as to change interval timer value T in accordance with the command written by the CPU 100 to the control register 110, the command being the command to select the PWM carrier from the sawtooth carrier and the triangular carrier. Furthermore, the synchronizing signal S12 is transmitted at the time at which the interval timer value T is lowered to the minimum value, that is, at every timer period. In addition, the elevation signal S18 is generated in response to the period signal S12, the elevation signal S18 indicating the status of the timer value T whether the same is increased or decreased. For example, when the interval timer value T is generating the triangular wave carrier, the timer value T is increased in the front portion of the timer period and the same is decreased in the rear portion of the timer period.

Figure 2:
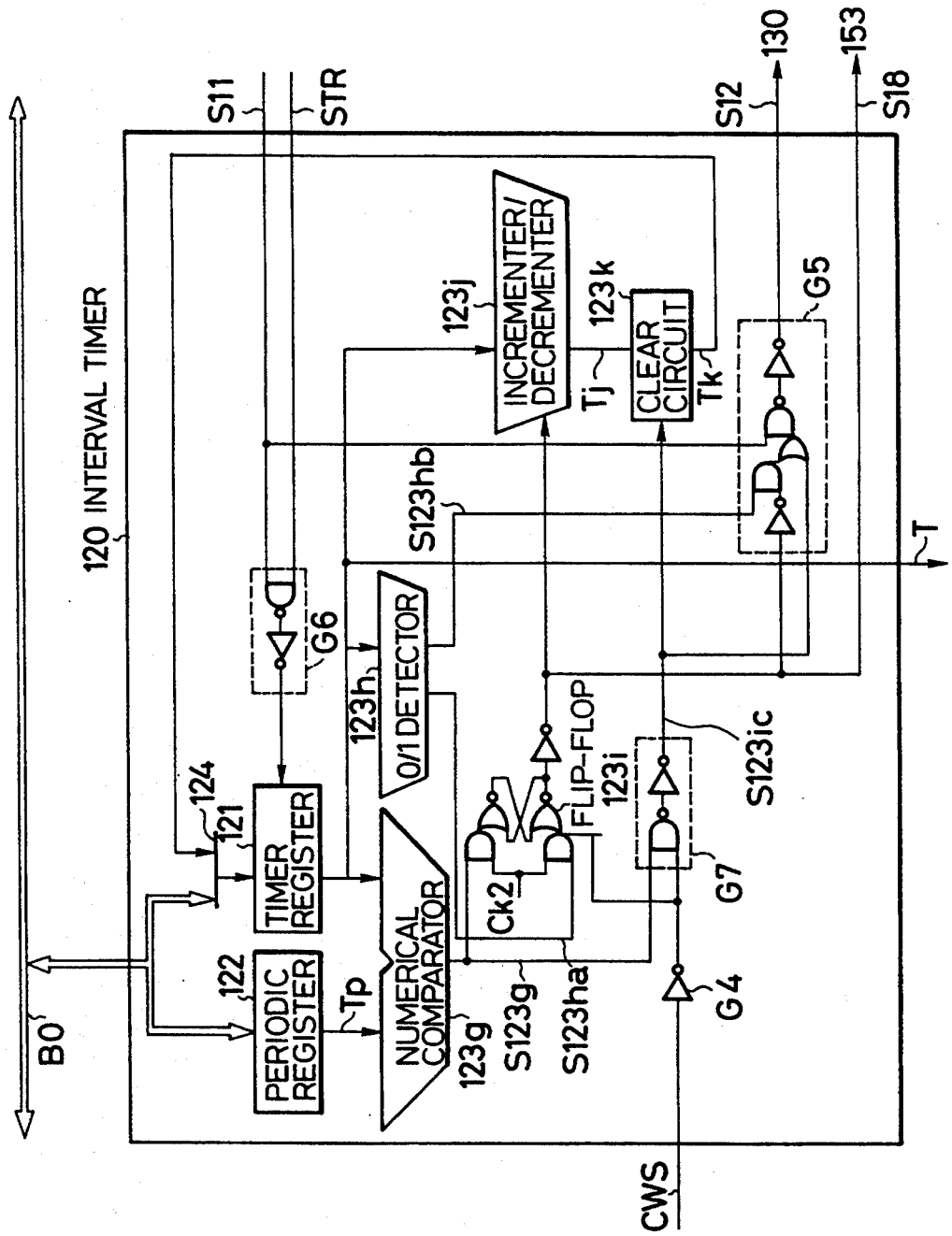
FIG. 2 is a specific structural view which illustrates an interval timer.

FIG. 2 illustrates the schematic structure of the interval timer 120. Referring to the drawing, the interval timer 120 comprises the timer register 121, the period register 122, a numerical comparator 123g, a 0/1 detector 123h, a flip-flop 123i, an incrementer/decrementer 123j, a clear circuit 123k, a multiplexer 124 and logical circuits G4, GS, G6 and G7. The timer register 121 receives the timer clock S11 from the logical circuit G6 and further receives data from the multiplexer 124 in synchronization with the timer clock S11 so as to transmit, as the interval timer value T, received data to the numerical comparator 123g, the 0/1 detector 123h and the incrementer/decrementer 123j. The period register 122 stores the maximum value Tp of the interval timer T via the system bus BO. The maximum value TP is the maximum value for specifying one period of the PWM signal when it is, as the timer value T, changed to the form of a sawtooth shape. Also it is the maximum value for specifying one period of the PWM signal when the timer value T is changed in the form of a triangular shape.

The numerical comparator 123g compares the interval timer value T and the maximum value Tp so as to make the maximum value signal S123g to be "1" when the above-described two values coincide with each other. The same makes the maximum value signal S123g to be "0" when they do not coincide with each other.

The 0/1 detector 123h transmits a minimum value signal S123ha showing whether or not the interval timer value T is zero and a 1-detection signal S123hb showing whether or not the same is 1. When the interval timer value T is zero, the maximum value signal S123ha is made to be "1". When the interval timer value T is not zero, the minimum value signal S123ha is made to be "0". When the interval timer T is "1" the 1-detection signal S123hb is made to be "1". When the interval timer value T is not "1", the 1-detection signal S123hb is made to be "0". The elevation signal S18 and a clear signal S123ic are generated in response to the maximum value signal S123g, the minimum value signal S123ha, the one-detection signal 123hb and the carrier waveform select CWS transmitted from the control register 110. As a result, the operations performed by the incrementer/decrementer 123j and the clear circuit 123k are controlled. The elevation signal S18 is "1" when the interval timer value T is increasing. In this state, the incrementer/decrementer 123j adds one. The elevation signal S18 is "0" when the interval timer value T is decreasing. In this state, the incrementer/decrementer 123j subtracts one. The clear signal S123ic makes the output value Tk from the clear circuit 123k to be zero when it is "1". The supplied value is transmitted as it is when the clear signal S123ic is "0".

Figure 3:
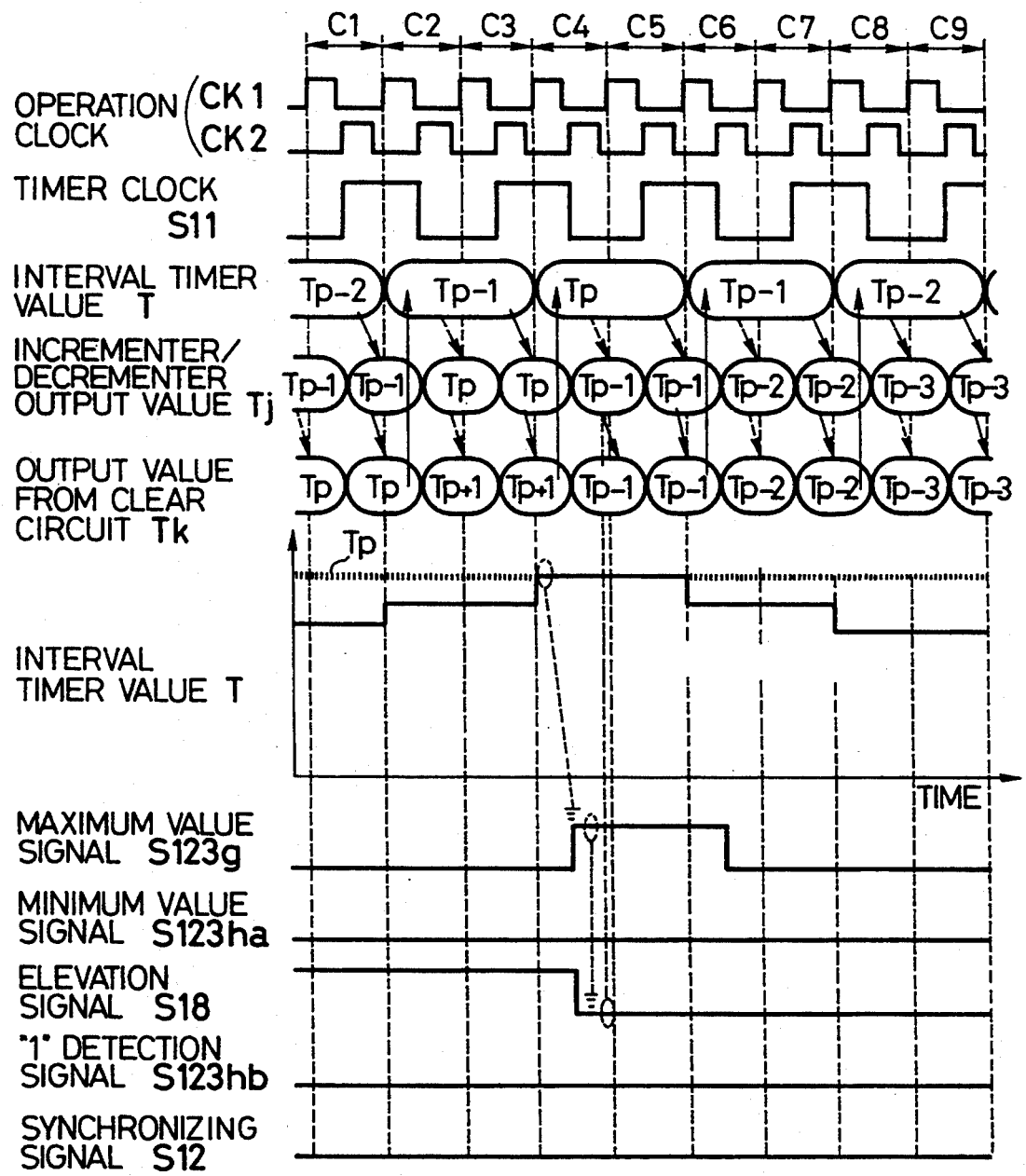
FIG. 3 is a timing chart for a generation of a triangular waveform carrier.
Figure 4:
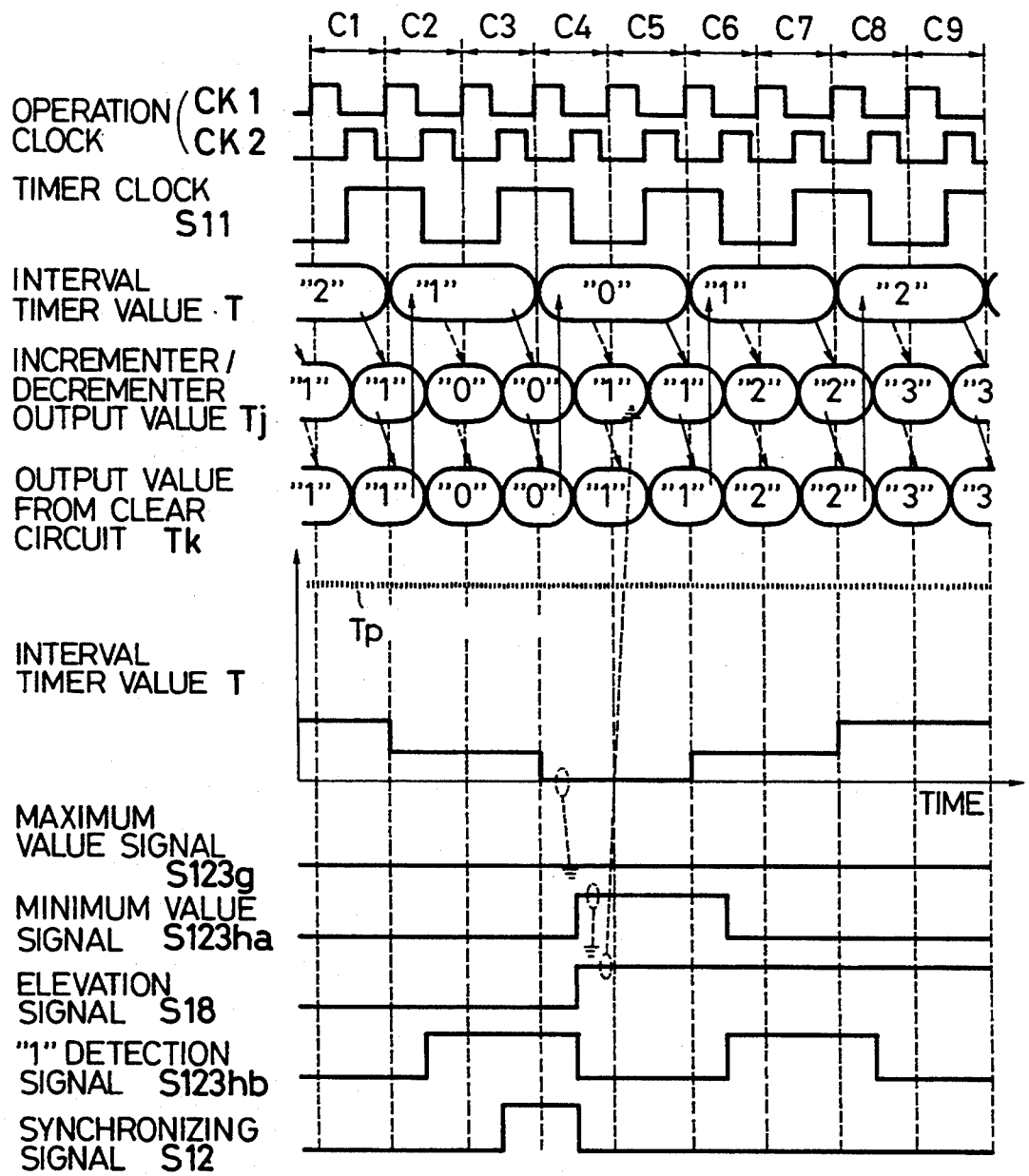
FIG. 4 is a timing chart for the generation of a triangular waveform carrier.

The operation in the case where triangular waveform carrier is assigned will be described with reference to FIGS. 3 and 4. When the triangular wave is assigned as the carrier by making the carrier wave select CWS to be "1", the flip-flop 123i is set. As a result, the elevation signal S18 becomes "1" so that an addition command is supplied to the incrementer/decrementer 123j. Therefore, the output value from the timer register 121 is successively added in the incrementer/decrementer 123j. The thus obtained timer value is transferred to the multiplexer 124 via the clear circuit 123k so as to be again supplied to the timer register 121. When the above-described operation is continued, the interval timer value T successively increases in the form of a step shape in synchronization with the timer clock S11. When the timer value T approaches the maximum value Tp, each of the signals is changed as shown in FIG. 3. That is, when the elevation signal is increasing in periods C1 to C4, the interval timer value T becomes Tp-2, Tp-1 and Tp while successively increasing by one. In period C4 in which the interval timer value T reaches Tp, the maximum value signal S123g transmitted from the numerical comparator 123g becomes "1". As a result, the flip-flop 123i is reset so that the elevation signal S18 is returned to "0" which shows the state of decrease. Therefore, a command of subtraction is issued to the incrementer/decrementer 123j. Then, the interval timer value T is successively subtracted by one at each input of the timer clock S11 so that the status is shifted to that shown in FIG. 4. Referring to FIG. 4, when the elevation signal S18 decreases in the vicinity of the time at which one period of the interval timer is ended, the interval timer value T is subtracted from 2 to 1 in the period C2 by the timer clock in the period C1 of the operation clock. At this time, the 0/1 detector 123h makes the 1-detection signal 123hb to be "1". Since the 1-detection signal 123hb is "1" and the elevation signal S18 is "0" at this time, the logical circuit G5 transmits the timer clock pulse at the period C3 as the synchronizing signal S12. The interval timer value T is subtracted to 0 by the above-described timer clock pulse. At this time, the 0/1 detector 123h makes the minimum value signal S123ha to be "1". In response to the minimum value signal S123ha, the flip-flop 123i is set, causing the elevation signal S18 to be inverted to become "1" in the period C4. That is, an addition command is issued to the incrementer/decrementer 123j. As a result, the interval timer value T increases in response to the ensuing timer clock pulses. Although the 1-detection signal S123hb becomes "1" from the period C6 to C8, the logical circuit G5 does not generate the synchronizing signal S12 since the elevation signal increases. As a result of the above-described operations, the triangular waveform carrier can be obtained. The logical circuit G5 generates only one synchronizing signal S12 in one period of the triangular waveform carrier.

Figure 5:
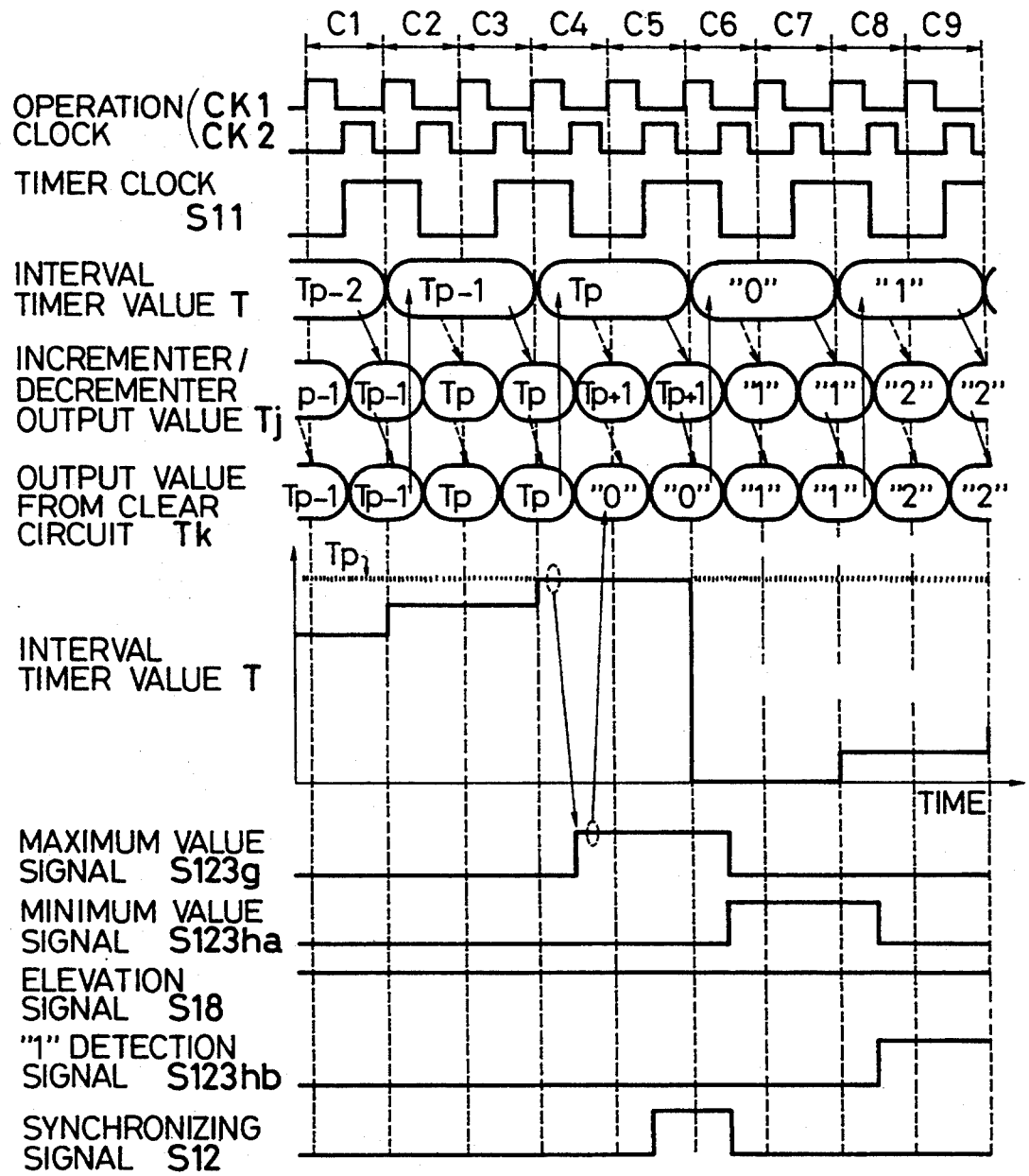
FIG. 5 is a timing chart for the generation of a sawtooth carrier.

In a case where the sawtooth carrier is assigned by the carrier wave selection bit CWS of the control register 110, each of the waveforms changes as shown in FIG. 5. In this case, the carrier wave selection CWS becomes "0", causing the flip-flop 123i to be forcibly set continuously. As a result, the elevation signal S18 is maintained at "1". Furthermore, the clear signal S123ic becomes the same as the maximum value signal S123g.

When the flip-flop 123i is set and the incrementer/decrementer 123j successively adds the output values from the timer register 121, the interval timer value T, as shown in FIG. 5, increases by one the timer clock pulse S11 in the periods C1 and C3. In the period C4, the periodic register value Tp and the interval timer value T coincide with each other so that the maximum value signal S123g becomes "1". As a result, the clear signal S123ic becomes "1" and the output value Tk from the clear circuit 123k becomes zero. The zero thus obtained is stored in the timer register 11 in accordance with the next timer clock pulse. As a result, both the maximum value signal S123g and the clear signal S123ic become "0", causing the clear circuit 123k, as it is, to pass the incrementer/decrementer output value Tj. As a result of the above-described operation, the interval timer value T is added by one in accordance with the ensuing timer clock pulse S11, causing the same to be again made to be the same as the maximum value Tp. In this case, the synchronizing signal S12 is transmitted in synchronization with the timer clock S11 generated after the clear signal has become "1". Thus, the sawtooth carrier can be obtained.

As described above, the triangular waveform carrier and the sawtooth carrier can respectively be generated. The triangular waveform carrier is able to satisfactorily reduce the high frequency components of the three-phase inverter in comparison to the effect obtainable with the sawtooth carrier. Furthermore, since the main frequency of the electromagnetic noise is two times the carrier frequency, it has been theoritically found that the noise can be satisfactorily reduced in the case where the triangular waveform carrier is employed. Therefore, this embodiment is arranged in such a manner that two types of carriers, that is, the sawtooth carrier, which has conventionally been included in a microcomputer, and the triangular waveform carrier can be generated. When the triangular waveform carrier is employed as the carrier, control performance of the DC motor control can be improved since the first transition of the PWM signal coincides with the start of the PWM period.

Figure 6:
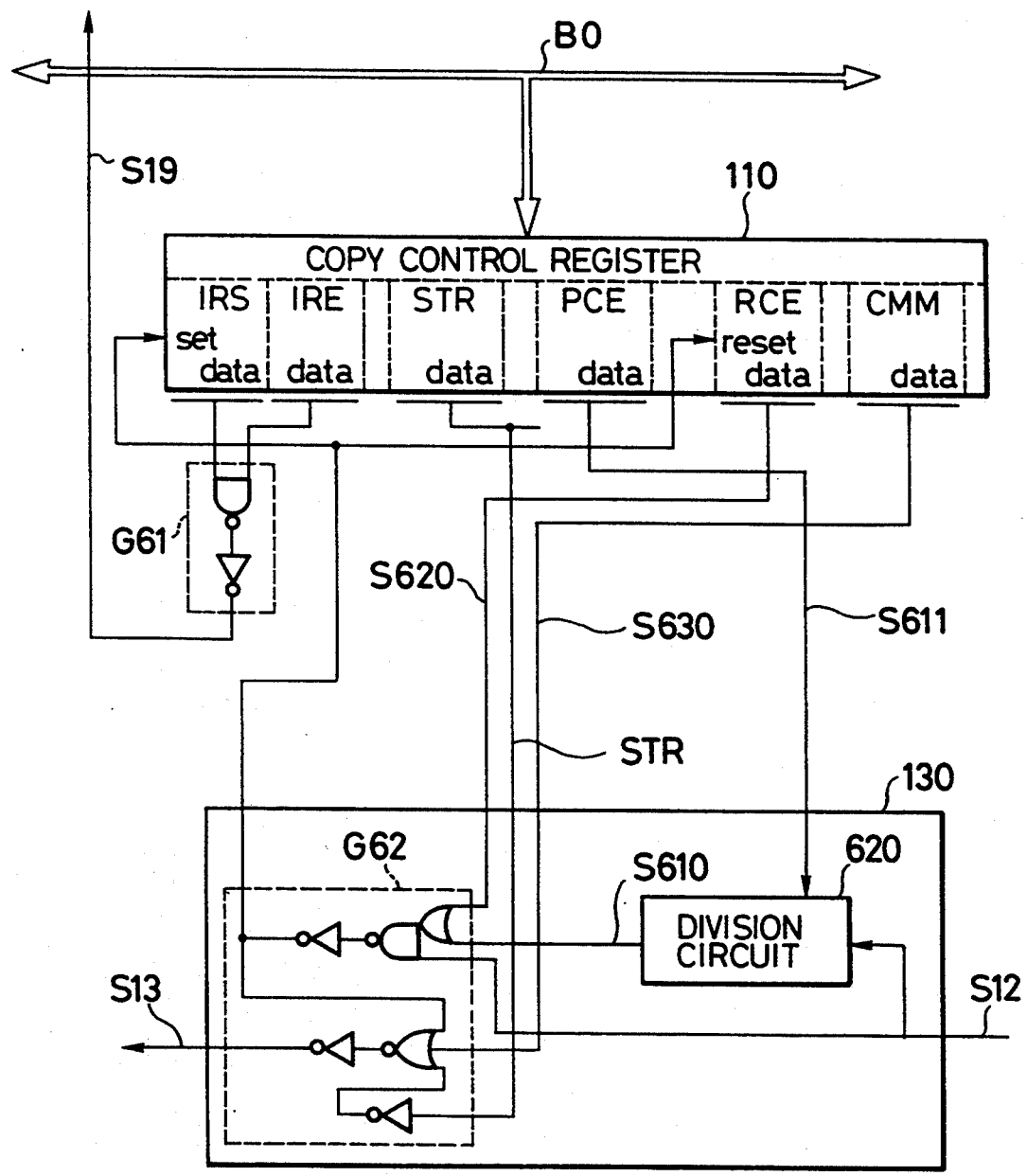
FIG. 6 is a block diagram which illustrates the structure of a copy enable circuit.

The copy enable circuit 130 generates the copy signal S13 whenever the synchronizing signals S12 have been generated N times, the copy enable circuit 130 generating the copy signal S13 in accordance with value N set in the control register by the CPU 100. The copy signal S13 synchronizes with the synchronizing signal S12 which shows that the interval timer value T is the minimum value. Therefore, a problem that time data in the memory, which is the subject of the comparison, exceeds the interval timer value T can be prevented in the time in the vicinity of the copying of the contents of the master memory 141 to the slave memory 142. Therefore, the output control command can be issued at a desired time set for the parallel comparison type contents addressable memory 140. Furthermore, the control period of the control device for changing the PWM signal must be an integral multiple of the interval timer period. The above-described desire can be realized by generating the copying signal S13 whenever the synchronizing signals S12 are generated by a predetermined number of times by the CPU 100 and by driving the contents addressable memory. The period of the copy signal S13 serves as the control period for the device to be controlled. Then, the specific structure of the copy enable circuit 130 will be described with reference to FIG. 6.

The copy enable circuit 130 comprises a division circuit 620 for dividing the synchronizing signal S12 in response to a division instruction signal S611 and a logical circuit G62 for converting a period copy enable signal S610 into the copy signal S13 in accordance with a command issued from the control register 110. The copy enable circuit 130 is arranged in such a manner that the copy signal S13 is brought into a copy status, that is, "1" by the logical circuit G62 when the operation start signal STR is "0". As a result of the above-described function, the slave memory 141 can easily be initialized. In a case where that function is not provided, it might be feasible to employ a structure in which the master memory comparison bit CMN is made to be "1" and the copy signal S13 is thereby made to be "1". However, the above-described structure is arranged in such a manner that the master memory 141 is the subject of the contents addressing operation. Therefore, there is a fear of misunderstanding taken place in information which is not defined by the master memory comparison bit CMN.

The division circuit 620 generates a periodic copy enable signal S610 by dividing the synchronizing signal S12 in accordance with the instruction made by the period copy enable portion PCE of the control register 110. The periodic copy enable signal S610 is supplied to the logical circuit G62 so that, when the CPU 100 writes "1" in the random copy enable bit RCE of the control register 110, the random copy enable signal S620 also becomes "1". Therefore, the copy signal S13 is generated in the logical circuit G62 in synchronization with the synchronizing signal S12 generated immediately after the above-described write operation performed by the CPU 100. When the copy signal S13 is generated, the random copy enable bit RCE is reset. When the copy signal S13 is generated, the interruption request status IRS is set. When the interruption request bit IRE is "1", the interruption signal is generated.

Figure 7A:
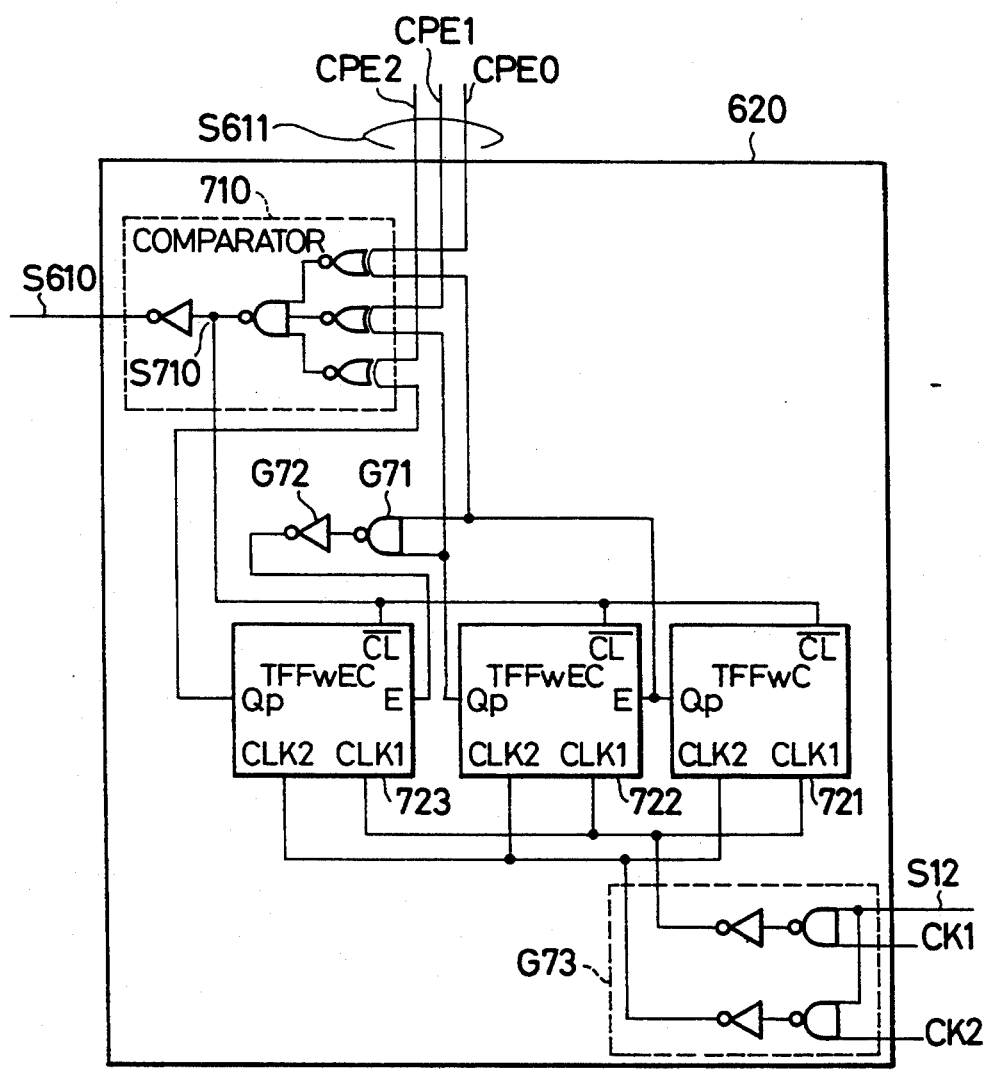
FIGS. 7A, 7B, and 7C each is a block diagram which illustrates the structure of a division circuit.
Figure 7B:
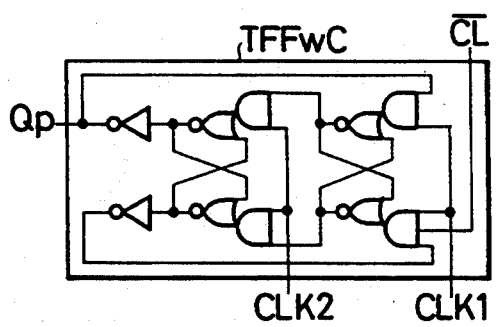
Figure 7C:
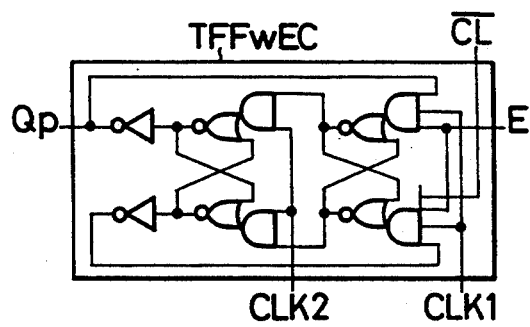
Figure 8:
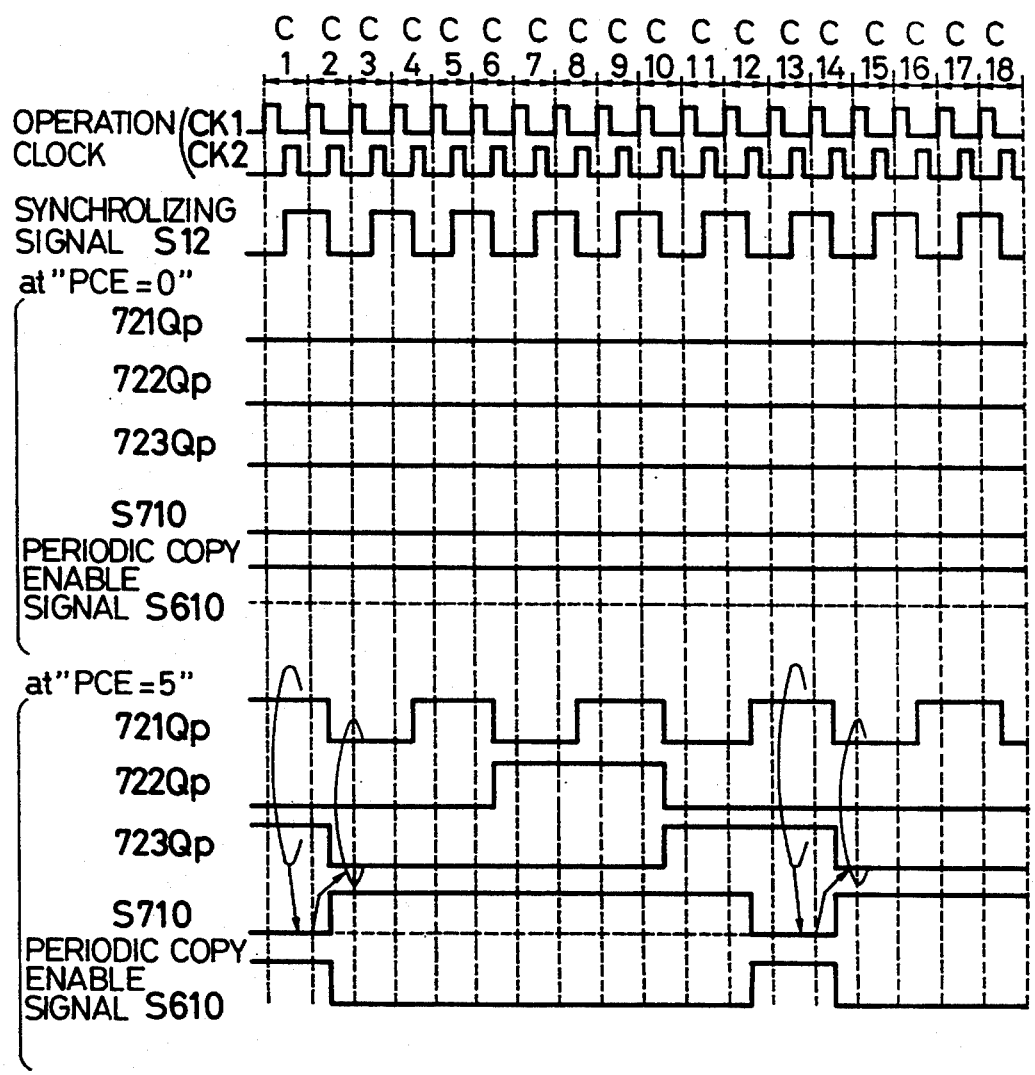
FIG. 8 is a timing chart of the division circuit.

FIG. 7 illustrates the specific structure of the division circuit 620 of the copy enable circuit 130. According to this embodiment, a two-phase non-overlap waveform is employed as the operation clock, the two-phase non-overlap waveform being employed in the main portion of high frequency operating CMOS microcomputers. The reason for this lies in that the two-phase overlap waveform operation clock necessitates four times of latches in one operation clock period but the two-phase non-overlap wave form necessitates only two times of the latches, causing an effect to be obtained in that the size of the circuit can be reduced. The above-described idea is common to all of the circuits according to the present invention. The division circuit 620 comprises flip-flops 721, 722 and 723, a comparator 710 and logical circuits G71, G72 and G73. As a result, a 3-bit synchronizing counter is constituted. The synchronizing signal S12 is counted by the thus constituted 3-bit synchronizing counter so that the numeral N indicated by 3-bit CPU2, CPU1 and CPU0 of the synchronizing copy enable portion PCE and the count made by the above-described synchronizing counter are subjected to a comparison. If they coincide with each other, the synchronizing counter is reset. The output from the comparator 710 serves as the periodic copy enable signal S610 obtained by dividing the synchronizing signal S12 by the value N of the periodic copy enable portion PCE. In this structure, the flip-flop 721 comprises a toggle type flip-flop with a synchronizing clear of a master slave structure. The flip-flops 722 and 723 comprise toggle enable flip-flops with synchronizing clear of a master slave structure. Then, the operation of the division circuit 620 will be described with reference to FIG. 8. When the value of the periodic copy enable portion PCE is "0", the output from each of the flip-flops is always "0" and the periodic copy enable signal S610 is always "1". As a result, the copy signal S13 is generated whenever the synchronizing signal S12 is generated. When the value of the periodic copy enable portion PCE is 5, that is, PCE0 is "1", the PCE1 is "0" and PCE2 is "1", the synchronizing counter constituted by the flip-flops 721 to 723 count from zero to five and return to zero. When the count is five, the comparator 710 detects the coincidence between the value of the periodic copy enable portion PCE and the count so that the periodic copy enable signal S610 is transmitted. The width of the periodic copy enable signal S610 is the same as one period of the synchronizing signal S12 and the period of the same is an integral multiple of the period of the synchronizing signal S12, that is, the integral multiple of the carrier period. Furthermore, the period of the periodic copy enable signal S610 is the value obtained by adding one to the value of the periodic copy enable portion PCE. For example, referring to the example shown in FIG. 8, since the value of the periodic copy enable portion PCE is "0" and "5", the period of the periodic copy signal S610 is one time and six times the period of the synchronizing signal S12.

The parallel comparison type contents addressable memory 140 comprises the master memory 141, the slave memory 142 and the comparator group 143, its memory being in the form of two layers for random writing and the comparison. The random write memory from the CPU 100 is the master memory 141 and the comparison memory with the interval timer 120 is the slave memory 142. The contents of the master memory 141 is copied to the slave 142 in response to the copy signal S13 so that data written by the CPU 100 is reflected by the contents addressable operation. The master memory 141 is sectioned into an output time master register group which corresponds to a tag portion and an output control master register group which corresponds to the contents addressable portion. The register of each of the above-described groups is assigned with an individual position (address) in the memory space of the CPU 100. That is, an access to each of the registers of the master memory 141 can be made via the system bus B0. Furthermore, the slave memory 142 is sectioned into an output time slave register group and an output control slave register group to correspond to the output time master register group and the output control slave register group of the master memory 141. The contents of the output time slave register group is subjected to a parallel comparison by the comparator group 143 while using the interval timer value T as the retrieval key. If a register which coincides with the interval timer value T is detected as a result of the above-described comparison, a coincidence signal of tag number which corresponds to the coincident output time slave register number n is transmitted. The output control command stored in the output control slave register #n (n: number) which corresponds to the tag #n is transmitted via an output control command bus S16. Simultaneously, an output enable signal S15 showing that the output signal group S17 has not changed is transmitted in accordance with the above-described command to indicate that data on the bus S16 is effective.

Figure 9B:
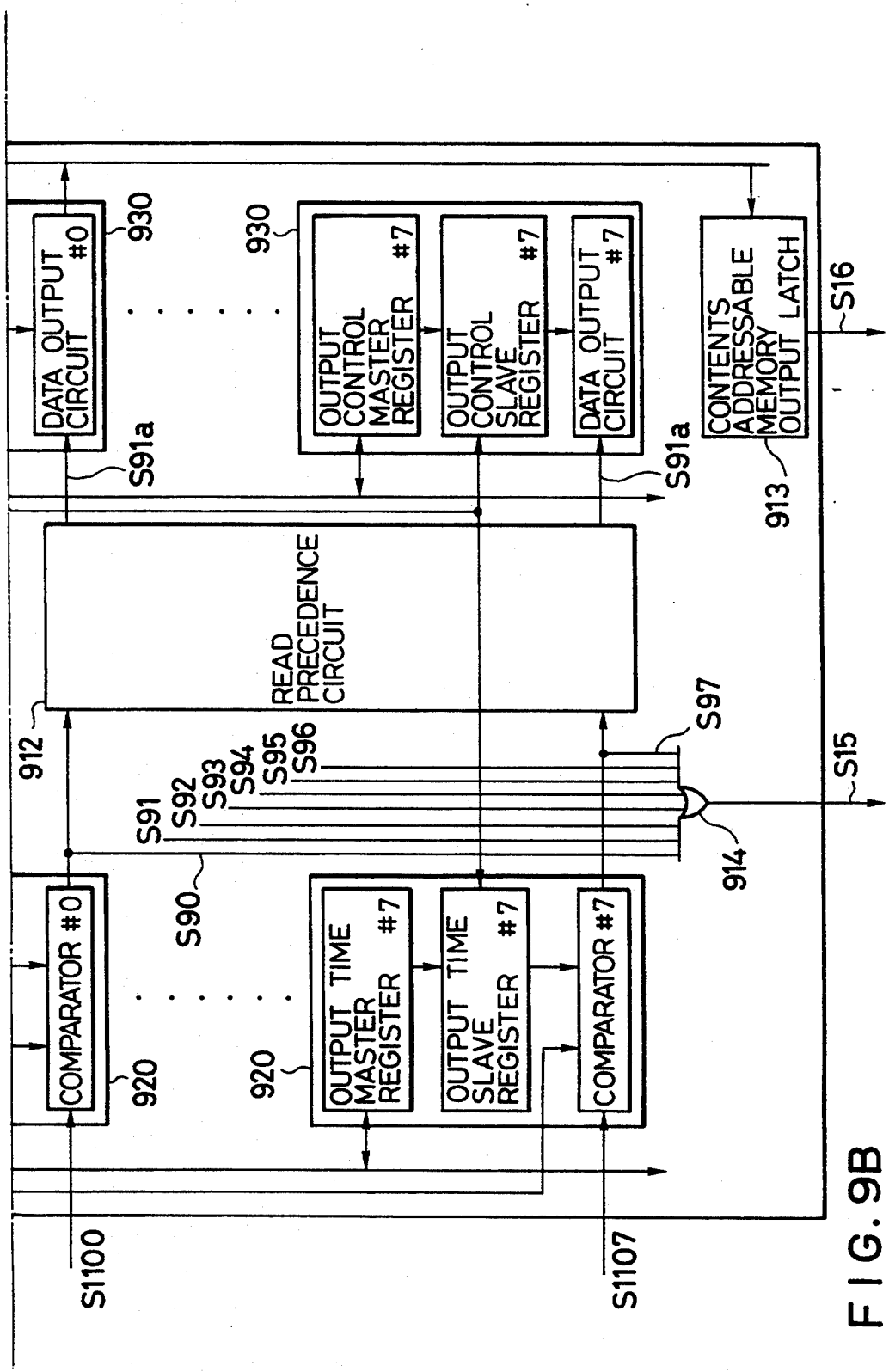

As described above, the contents addressable memory 140 stores, the tag portion and the contents addressable portion thereof, the output time data and the output control command data. Furthermore, the interval timer value T is used as the retrieval key. As a result, the output control command can be issued at a desired time. Furthermore, its memory is arranged in the two-layer shape and the CPU writes, to the master memory 141, output time data which defines the time at which the output signal is changed and output control command data which defines the binary status after the above-described change. Therefore, if the contents are re-loaded in the intermediate point of the period (carrier period) of the interval timer, the contents of the slave memory 142 remain without being reloaded. As a result, generation of an error in the pulse width of the PWM signal can be prevented. Then, the specific structure of the contents addressable memory 140 will be described with reference to FIG. 9.

The contents addressable memory 140 comprises a contents addressable memory I/O circuit 911, a read precedence circuit 921, a contents addressable memory output latch 913 and an OR gate 914 in addition to the master memory 141, the slave memory 142 and the comparator group 140. The master memory 141 and the slave memory 142 are respectively sectioned into the tag portion and the contents addressable portion. That is, one output time master register #n, one output time slave register #n and one comparator #n are collected so as to form one layout cell which constitutes a tag word cell 920. A plurality of the thus formed tag word cells 920 are provided. Furthermore, one output control master register #n, one output control slave register #n and one data output circuit #n are collected so as to form one layout cell which constitutes an output data word cell 930. A plurality of the thus formed output data output cells 930 are provided. In the description made above, n designates the number. Since the contents addressable memory 140 is constituted as described above, the length of wiring the master memory 141, the slave memory 142 and the comparator group 143 can be shortened and the area necessary to form the circuits can be reduced. Furthermore, the load capacity of the circuit can thereby be reduced, causing the transistor in the output step of each of the registers to be reduced or omitted from the structure. As a result of the above-described two effects, the size of the layout of the contents addressable memory 140 can be reduced. Furthermore, since the I/O circuit 911 is commonly constituted by the plurality of registers, the size of the layout can be reduced.

In the thus arranged structure, when the copy signal S13 is received, the contents in each of the master registers are copied to the slave registers. The interval timer value T is, as the retrieval key, supplied in parallel to each of the comparators so as to be compared with each of the output time slave registers in parallel. The comparator #i (i: number) in which the contents coincide with each other transmits a tag #i coincide signal S9i. If any of a tag #0 coincidence signal S90 to a #7 coincidence signal is transmitted, the output enable signal S15 becomes "1". In a case where two or more contents coincide with each other, the read precedence circuit 912 transmits a read signal S9ja to the small tag number (for example, j-th) so that an output control command of the output control slave register #j is read out via a data output circuit #j through the output data bus Bout. That is, one output control command is normally generated. According to the above-described structure, a contents addressable memory output latch 913 is a differential amplifier for amplifying the voltage of the output data bus Bout to the voltage amplitude of the output control command bus S16. The above-described precedence circuit 912 is able to effectively control the space vector type PWM inverters which are defined in accordance with the sequential order of the generation of the output control commands. Since the output control command which is transmitted in the latter sequential order is assigned to a small tag number (which may be called a small register number), the output control command which is transmitted in the latter sequential order proceeds in a case where two or more tags simultaneously coincide with each other. As a result, an error in the pulse width of the transmitted PWM pulse can be prevented. As the method of decoding the output control command, there are, as described later, provided four types of methods assigned in accordance with the output control mode OCM in the output control command. According to this embodiment, two sets composed of three parallel outputs are employed. When the scan bit SCN for the control register 110 is made to be "1", only one comparison enable signal of 8 comparison enable signals S1100 to S1107 is made to be "1". The position of "1" is sequentially shifted by one at each operation clock period. Furthermore, only the comparator the comparison enable signal is "1" is allowed to perform the comparison operation. As a result, all of the comparison operations for each of the 8 operation clock periods are completed. In a case where there is a possibility that two or more tags simultaneously coincide with each other and the read precedent circuit 912 cannot cause the desired result, the above-described scan bit SCN acts to cause the desired result When the scan bit SCN is "0", all of the comparison enable signals S1100 to S1107 are made to be "1".

Then, the output control circuit 150 will be described. The control command on the output control command bus S16 is fetched by a content addressable memory command register 151. When the output enable signal S15 showing the above-described command is effective is received, a decoder 153, in accordance with the above-described control command, writes the value assigned to the assigned bit of the output register 154. As a result, a desired PWM pulse is transmitted to the output signal group S17. In a case where the triangular wave is selected as the carrier of the PWM pulse, one output time data item coincides with the interval timer value T two times in the front and the rear portion of the interval timer period. The PWM pulse generating device must issue commands to change the PWM pulse to the contrary binary state at the two coincident times. For example, the PWM pulse generating device must issue a command to rise the output signal in the front portion of the timer period and a command to lower the same in the rear portion. However, it is not preferable that the parallel comparison type contents addressable memory 140 issues different commands in the front and the rear portions of the timer period. The reason for this lies in that two sets of output control master register group and the output control slave register groups must be provided so as to be used in the front and the rear portions of the timer period, causing the size of the circuit to be excessively enlarged. Therefore, the output value of the same command is inverted in the front and the rear portions of the timer period so that the necessary number of the sets of the output control master register group and the output control slave register group is reduced to one. That is, the decoder 153 receives the elevation signal S18 transmitted from the interval timer 120 so as to control the output register 154 in accordance with the above-described elevation signal S18 and the control command of the contents addressable memory command register 151. The CPU 100 is able to write in units of a bit to the output register 154 via the system bus BO. The above-described function of the CPU 100 is a support action which is effective when the number of words of the parallel comparison type contents addressable memory 140 is not sufficient and it cannot thereby control the output signal group S17. Furthermore, the output of the PWM pulse can thereby be urgently stopped in an accident. Therefore, the structure is arranged in such a manner that a CPU command register 152 is provided and a circuit arranged similarly to the decoder circuit for the contents addressable memory command register 151 is provided in the decoder 153 so that the CPU 100 is able to individually or collectively change the output signal group S17 by using the output control command similarly to the parallel comparison type contents addressable memory 140. However, it is difficult for the CPU 100 to synchronously change its command to be issued to the CPU command register in the front and the rear portions of the interval timer period. Therefore, the output value change to correspond to the front and the rear portions of the timer period is not performed. Furthermore, in a case where the command from the CPU 100 and the command from the parallel comparison type contents addressable memory 140 are about to change the same output signal, the decoder 153 proceeds the command from the CPU 100. As a result, the CPU 100 easily operate the output signal group S17.

FIG. 10 illustrates the specific structure of the output control circuit 150. As shown in FIG. 10, the output control circuit 150 comprises a contents addressable memory command register 151, a CPU command register 152, a bit write decoder 153c, a CPU bit data aligner 153d, a contents addressable memory bit write decoder 153a, a contents addressable memory bit data aligner 153b, an output arbitration circuit 153e and the output register 154. The CPU command register 152 is connected to the CPU 100 via the system bus BO. The output control command is supplied to the contents addressable memory command register 151 via the output control command bus S16. The above-described output control command is composed of 2 bits (OCB1 and OCM0) of output control mode OCM and 8 bits (OSD7 to OSD0) of the output signal value OSD as specifically shown in FIG. 11. When the output control mode OCM is (0, 0), an 8-bit parallel output is made. The output signal value OSDi (i is an integer selected from 0 to 7) is set to corresponding bit PSi of the output register 154 so as to be transmitted. When the output control mode OCM is (0, 1), a parallel output with 2 sets of 3-bit enable is made. The output signal value OSDi (i is an integer selected from 0 to 2) is set to the corresponding bit PSi of the output register 154 only when the output signal value OSD3 is 1. The output signal value OSDi (i is an integer selected from 4 to 6) is set to the corresponding bit PSi of the output register 154 only when the output signal value OSD7 is 1. The above-described mode is a mode in which 6 PWM pulses which are necessary to control a space vector type three-phase inverter are collectively changed or a mode in which three signals for assigning three PWM pulses which are necessary to control the inverter for a three-phase 120-degree energizing type brushless motor and the energizing phase are collectively transmitted. When the output control mode OCM is (1, 0), a parallel output with 2 sets of 2-bit enable is made. The output signal value OSDi (i is 0 or 1) is set to the corresponding bit PSi of the output register 154 only when the output signal value OSD3 is "1" so as to be transmitted. The above-described mode is a mode in which a DC motor drive circuit is controlled by an H-type arm. In the H-type arm drive circuit, four PWM pulses or two PWM pulses and two signals instructing the energizing direction are collectively transmitted. The output signal value OSDi (i is 4 or 5) is set to the corresponding bit PSi of the output register 154 only when the output signal value OSD7 is "1" so as to be transmitted. When the output control mode OCM is (1, 1), a single output with assigned 1-bit position is made. The exclusive OR of the output signal value OSD0 and the elevation signal S18 are set to the bit PSi which corresponds to the position defined in accordance with a number 0 to 7 given from the output signal values OSD7, OSD6 and OSD5 of the output register 154 so as to be transmitted. The above-described mode is provided for the purpose of maintaining the conventional general assigning function of the output terminal of the PWM pulse output circuit.

Two bits (OCM1 and OCM0) of the output control mode OCM, of the above-described output control command, and a portion which becomes the output enable, in accordance with the output control mode of the output signal value OSD, are sectioned into write signals BWam7-0 in units of one bit by the contents addressable memory bit write decoder 153a. Furthermore, the contents addressable memory bit data aligner 153b makes the output value to be data ODam7-0 which corresponds to desired output positions. Similarly, the output control command written in the CPU command register 152 via the system bus BO is sectioned into write signals BWcpu7-0 in units of one bit by the CPU bit write decoder 153c. The CPU bit data aligner 153d makes the output value to be data ODcpu 7-0 which corresponds to desired output positions. At this time, the output value is not inverted by the elevation signal S18. The output arbitration circuit 153e, in units of one bit, transmits the output which is made in accordance with the command issued from the CPU 100 prior to the output which is made in accordance with the command issued from the parallel comparison type contents addressable memory 140. In accordance with the command issued from the CPU 100, an interruption into an optional signal can be made at an optional time with respect to the regular generation of the pulses by the parallel comparison type contents addressable memory 140. Therefore, the change of the PWM pulse which accidentally takes place at the time of controlling the device can be enabled. When the output signal reset bit OSR of the control register 110 is "1", all of the bits of the output register 154 are reset. As a result, the motor or the like can be enabled to be urgently stopped.

FIGS. 12 and 13 illustrate the overall time charts for the operation for generating the PWM pulse according to this embodiment. FIG. 12 illustrates a case where a sawtooth carrier is selected by making the carrier waveform selection bit CWS of the control register 110. In order to provide an on-delay time, which is necessary to serve as the drive signal for the inverter, in the output signal PSO which is the PWM pulse, an on-delay time is set to the tag #7 and a command to make the output signal PSO to be "1" is set as its output control command. Furthermore, in order to make the output signal PSO to return to "1" in accordance with the pulse width resulted from the control calculation, an off-time of the output signal PSO is set to the tag #0. The above-described setting is written in an output time master register #0 at each control period so as to be copied to an output time slave register #0 in synchronization with the completion of the final PWM period in the control periods.

According to this embodiment, the random copy enable bit RCE of the control register 110 is made to be "1" by the CPU 100 after the completion of the control calculation so that the copy at each control period is instructed. According to that method, the periodic copy enable portion PCE and the division circuit 620 can be omitted from the structure in a case where the control period is two to three times the PWM period. As a result, the size of the circuit can further be reduced. The reason for this lies in that the random copy enable bit RCE can be made to be "1" in the same PWM period since the difference in the control calculation time can be limited to 30% or less regardless of a fact whether the control calculation time is the shortest time or the longest time. The random copy enable bit RCE is arranged to automatically be reset simultaneously with the copying operation so that the load to be applied to the CPU is reduced. The process of the reflection of the result of the control calculation to the output signal will be described. For example, control calculation result TO (j) in the j th control period is written to the output time master register #0 in the k−1 th interval timer period. In accordance with the copy command issued from the CPU 100 in the above-described timer period, it is copied to the output time slave register #n0 (that is, tag #0) by the copy enable circuit 130 in synchronization with the end of the above-described timer period. That is, it is reflected to the output signal PSO at the j+1 th control period. For example, the tag #0 coincides at time ta in the k-th timer period in the above-described period so that the output signal PSO returns to "0".

FIG. 13 illustrates a case where the triangular waveform carrier is selected by making the carrier waveform selection bit CWS of the control register 110. According to this case, the output control mode OCM of the output control command is made to be a single output with an instruction to make the first bit to be 1. As a result, the output value can be inverted by the elevation signal S18. Therefore, for example, the tag #0 coincides with the interval timer value T twice at times ta and tb in the k th timer period. The output signal PS0 is made to be "1" in accordance with the output control command at time ta and the output signal PSO is made to be "0" contrary to the output control command in accordance with the elevation signal S18 at time tb. As a result, the triangular waveform carrier can be formed by the inversion of the output control command by the elevation signal S18.

According to this embodiment, the PWM pulse generating circuit request to the CPU for the interruption by the copy at each period which is the integral multiple of the PWM period when the interruption request IRE is "1". The CPU carries out the control calculation of the device in accordance with the interruption request. Therefore, the necessity of the control period interval timer for the purpose of making the control calculation period to be constant can be eliminated according to this embodiment. That is, the PWM pulse generating device according to the present invention will reduce the size of the chip of the microcomputer for controlling the device.

As described above, according to this embodiment shown in FIG. 1, the contents of the slave memory can be made to always be constant in the pulse period. Therefore, if the pulse width of the pulse signal is changed, the generation of an error in the pulse width can be prevented. Furthermore, since all of the contents are simultaneously copied from the mask memory to the slave memory, the regulation between pulse signals can be maintained even if a plurality of pulse signals are generated. Furthermore, since the memory is formed in a two-layer structure and the contents of the master memory are copied to the slave memory in response to the copy signal, the tags coincide at least once in each of the pulse periods regardless of the time at which the writing to the master memory is performed. Therefore, the contents addressable operation can be stably performed. In addition, since the contents of the memory are not influenced by the write time, the load applied to the calculation means at the time of calculating the period of the pulse signal can be reduced. Furthermore, the contents addressable memory is composed of the plurality of tag word cells and the plurality of output data word cells. Therefore, the length of the wiring can be shortened so that the circuit area and the size of the layout can be reduced.

According to the above-described embodiment, the structure is arranged in such a manner that the function of the sub-processor 160 shown in FIG. 1 is stopped and the CPU 100 performs the function to be performed by the sub-processor 160. Then, the function of the sub-processor 160 will be described. The sub-processor 160 is able to supply/receive data to and from the CPU 100 via the system bus BO as shown in FIG. 1. Accordingly, the procedure for calculating the output time data of the above-described output pulse is programmed or the calculating procedure is composed of the logical circuit. Furthermore, the sub-processor operation enable portion SPE of the control register 110 is made to be "1". As a result, the calculation can be performed. Therefore, the load to be applied to the CPU 100 at the time of calculating the output time data can be reduced. Therefore, the entire control calculation process performed by the CPU 100 can be improved.

Figure 14B:
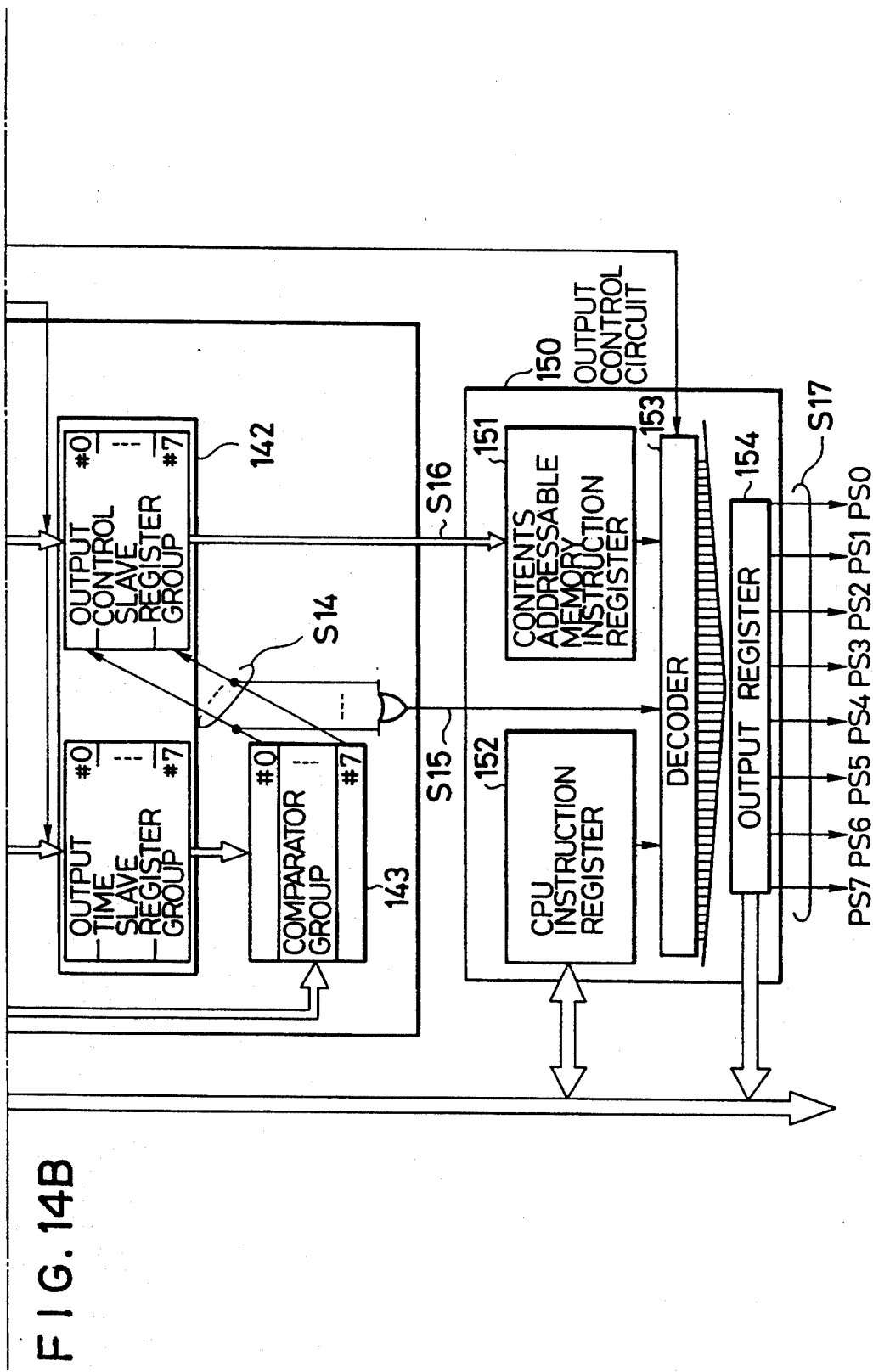

According to the structure shown in FIG. 1, the sub-processor 160 accesses the output time master register from #0 to #7 via the multiplexer 170. However, another structure shown in FIG. 14 may be employed in which it accesses from the output time master register #0 to the register except for the output time master register #7 via the multiplexer 180 and a local bus B1. According to the above-described structure, the process which synchronizes with the output pulse, that is, the setting from the control register 110, the period register 122 and the output control master register #0 to #7 can also be performed by the sub-processor 160 so that the load to be applied to the CPU 100 can further be reduced in comparison to the structure shown in FIG. 1. According to the embodiment shown in FIG. 14, the interruption signal S19 is supplied to the sub-processor 160 in order to synchronize with the output pulse so that the interruption process of the CPU 100 can be performed by the sub-processor 160.

The structure of the sub-processor 160 is shown in FIG. 15. The sub-processor 160 comprises a register group 161 composed of general purpose registers #0 to #7, a calculation unit 162 capable of performing the arithmetic calculation and the logical calculation of data to be stored in the register group 161, a sub-processor 160 and a transference control unit 163 for transferring data between the sub-processor 160 and other registers. The control of each of the units included in the sub-processor 160 is performed by a control program or a logical circuit included in each of the units. The above-described control of each of the units is performed in such a manner that the arithmetic calculation and the logical calculation of data, which has been written to the register group 161 by the CPU 100, to be performed by the calculation unit 162 are controlled. Furthermore, the transfer of the output time data or the like, which is the result of the calculation, to the register such as the output time master register group is controlled by the transfer control unit 163.

Figure 16:
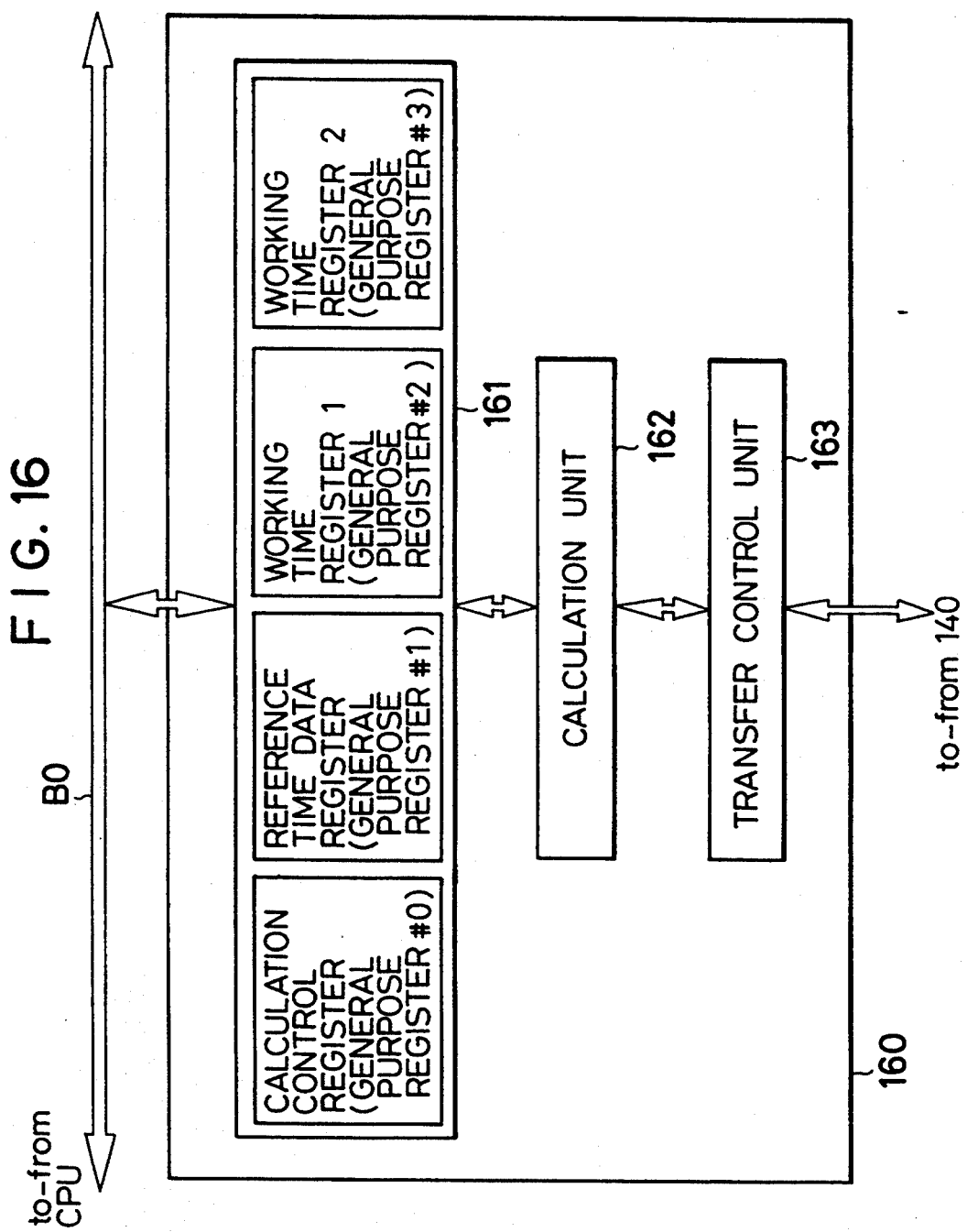

The entire control calculation of the CPU 100 can be improved in terms of the process distribution by dividing a portion of the calculation operation of the output time of one pulse signal which does not relate to other pulse signals. Furthermore, a significant effect to reduce the load of the CPU 100 can be obtained by causing the sub-processor 160 to calculate the calculation relating to the output time, that is, the output time of two or more pulse signals with which an output time can be obtained from another output time. As an example of the above-made description, an example in which a three-phase inverter, which is an electricity conversion device for driving an electric motor, is controlled is shown in FIG. 16. The three-phase inverter uses 6 PWM signals composed of two signals for each phase for the purpose of generating three-phase AC voltage, that is, phases U, V and W. The two PWM signals for each phase are formed by substantially inverting the polarity of the output signal. However, there is a necessity of making the above-described two PWM signals to become low in a specific period due to the characteristics of the transistor for the electricity supply. The output time of each of the PWM signals can be obtained by calculating the reference time data showing the average voltage of its phase and the specific time data at which the two PWM signals become low. For example, output time data TUa (i) and output time data TUb (i) of the two U-phase PWM signals in the case of the modulation carrier of the PWM is the triangular wave can be expressed as follows assuming that the reference time data is TU (i) and the specific time is sectioned into the working times DUa and DUb:

when the phase current of the phase U is positive;

$$TUa\ (i) = TU\ (i)$$

$$TUb\ (i) = TU\ (i) - DUb$$

when the phase current of the phase U is negative;

$$TUa\ (i) = TU\ (i) + Dua$$

$$Tub\ (i) = TU\ (i)$$

In order to make the description meet the application function, the general purpose register #0 is called a calculation control register, the general purpose register #1 is called a reference time data register, the general purpose register #2 is called a working time register 1 and the general purpose register 33 is called a working time register 2. The CPU 100 writes information about the phase current value of the phase U to the calculation control register at each control period and as well as it writes the reference time data of the phase U to the reference time data register. The sub-processor 160 carries out the above-described calculations of the above-described equations in accordance with the contents of the calculation control register. Then, the results of the above-described calculations are stored in the output time master register #0 and the output time master register #1. As a result, the determination whether the phase current in the CPU 100 is positive or negative can be performed and the load to be applied at the time of calculating the output time data can be reduced.

Furthermore, the reference time data for each of the phases U, V and W can be obtained by the trigonometric function calculation of the phase angle of the voltage and one reference time data since the sum of the three-phase AC voltage is zero. The CPU 100 writes information of the phase current of each phase and phase angle data to the calculation control register. Furthermore, the sub-processor 160 is able to calculate all of 6 PWM signals by using the above-described data and the preceding reference time data and the working time data 1 and 2. According to the above-described calculating procedure, the CPU 100 must reload only two registers, that is, the calculation control register and the reference time data register. Therefore, the load applied at the time of the calculation can be reduced and as well as the load applied at the time of the transferring operation can be reduced.

Figure 18:
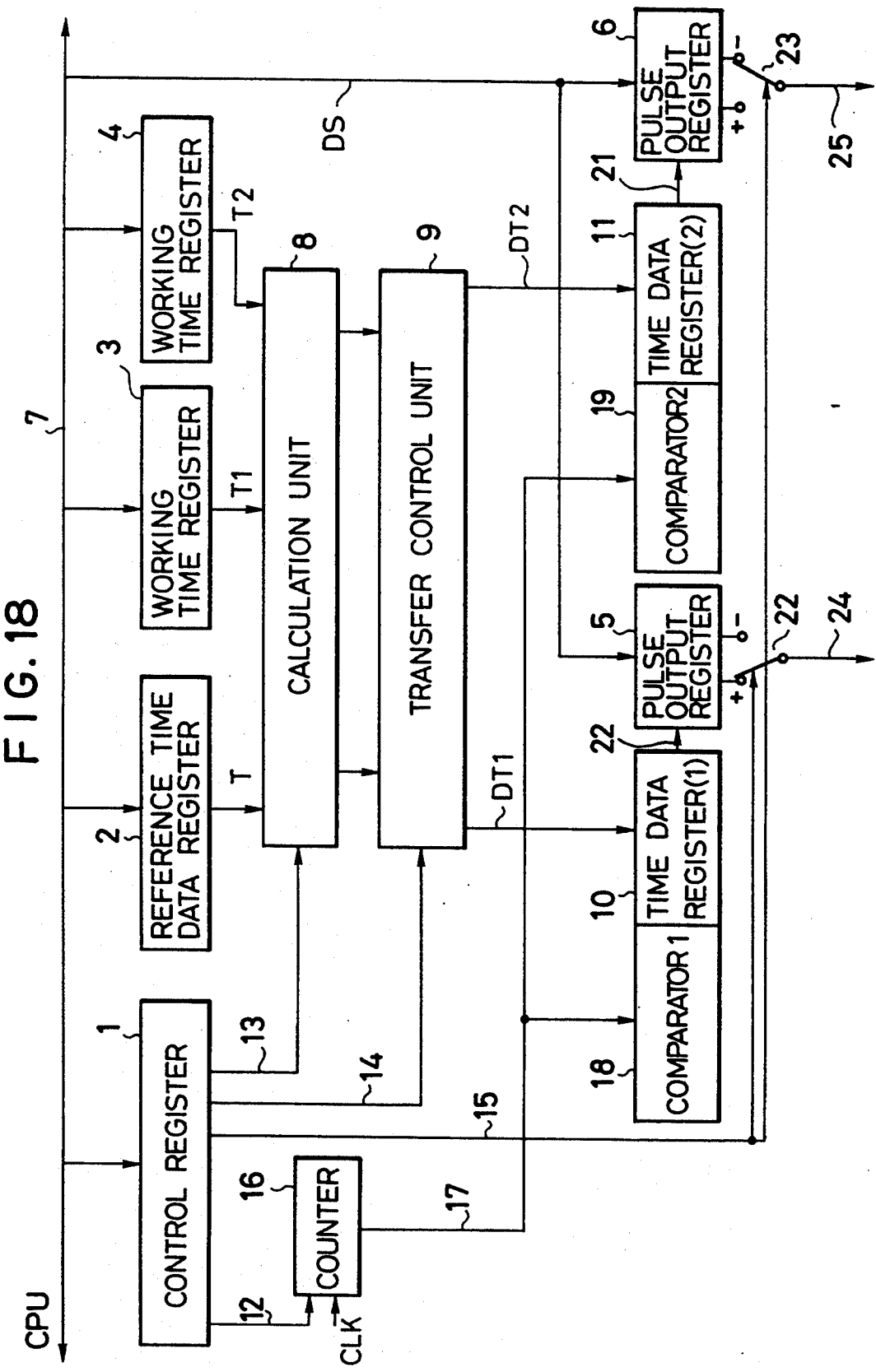
FIG. 18 is a block diagram which illustrates another embodiment of the pulse generating device according to the present invention.

FIG. 18 is a block diagram which illustrates a pulse generating device capable of controlling firing of the switching device such as the bridge structure inverter or the like by utilizing the function of the above-described sub-processor 160. According to this embodiment, a pair of pulses are generated which are arranged in such a manner that the timing axis of the pulse and the width of the same have a constant relationship and their binary statuses hold a contrary complementary relationship (to be called a "inverse polarity). For example, it is able to generate a gate pulse for driving the switching device for the upper and lower arms of an inverter. That is, four data items consisting of time data about the pulse first transition point and the last transition point of the pulse and data items for instructing the binary status of the signal at each time are necessary to generate one pulse. Therefore, the CPU 100 must transfer at least four data items for one pulse to the register or the like of the pulse generating device. In a case of a three-phase inverter of a bridge structure for controlling the operation of an electric motor, gate pulse must be generated for the switching devices of the three-phases U, W and W×6 arms. Therefore, at least 24 data items must be generated to transfer them. As a result, an excessively large load is applied to the CPU 100 at the time of the data transference. In particular, if an intention is made to raise the frequency of the carrier wave at the time of the control of the pulse width modulation (PWM), the load at the time of the transference operation is increased excessively. Furthermore, in order to prevent the short cut of the bridge structured upper and the lower arms which are complementarily turned on/off, a pair of gate pulses which corresponds to the upper and the lower arms have a time called "dead time" in which both of them are turned off. Therefore, a problem arises in that the load for the CPU 100 is also increased excessively at the time of calculating the above-described dead time. Therefore, the structure shown in FIG. 18 is arranged in such a manner that the number of the data items which are necessary to generate the pair of pulses the attribute of each of which has a predetermined correlation can be reduced. Furthermore, the calculation for controlling the timing relationship (for example, the dead time) between the pulses at their first transition points or the last transition points is performed. As a result, the load of the upper CPU 100 can be reduced.

Referring to FIG. 18, a control register 1, a reference time data register 2, first and second working time registers 3 and 4, and first and second status data registers 5 and 6 are respectively connected to the upper CPU via a bus 7. The above-described registers respectively correspond to the register groups 161 shown in FIGS. 15 or 16. Each of the above-described registers is arranged to store a control signal, reference time data T, first and second working time data T1 and T2 and status data DS transferred from the upper CPU. The status data DS is transferred at the initialization and other data items are, as described later, periodically transferred in response to the countup signal.

The reference time data and the working time data T1 and T2 are fetched by a calculation unit 8 so that time data DT1 and DT2 are obtained from a predetermined calculation. The thus obtained time data DT1 and DT2 are respectively transferred to the first and second time data registers 10 and 11 by a transfer control unit 9. The calculation unit 8 and the transfer control unit 9 respectively correspond to the calculation unit 162 and the transfer control unit 163 shown in FIGS. 15 or 16.

The control signal contains a counter control signal 12, a calculation control signal 13, a transfer control signal 14 and an output switch control signal 15. The counter control signal 12 is composed of a countup signal and a countdown signal which are supplied at predetermined periods which are supplied to an up-/down counter 16. The up/down counter 16 is arranged to receive clock pulse CLK. A counted value 17 of the up/down counter 16 is supplied to first and second comparators 18 and 19. The comparators 18 and 19 make comparisons with time data DT1 and DT2 of the time data registers 10 and 11. When they coincide with each other, corresponding coincidence signals 20 and 21 are supplied to first and second pulse output registers 5 and 6. The pulse output registers 5 and 6 are arranged to be the same structures each of which comprises a flip-flop and respective have a pair of output terminals (+) and inverted output terminal (−) which are maintained at the complementary status each other. When the status data is received, the instruction to reset an inverted status of the binary status is made by the status data is made. The pair of the output terminals are connected to output lines 24 and 25 of pulses (1) and (2) via output switches 22 and 23. The output switches 22 and 23 are switched by the above-described output switch control signal so that a pulse of a desired polarity can be obtained. According to this embodiment, the pulse (1) is set to the positive side and the pulse (2) is set to the negative side.

Next, the operation of the thus constituted structure according to this embodiment will be described with reference to FIGS. 19 and 20. FIG. 20 is a schematic view of a PWM pulse which is processed by the upper CPU. The upper CPU makes a comparison between an output voltage command of the inverter and the triangular carrier wave so as to obtain the reference pulse of the upper and the lower arms. Then, it determines working time data for narrowing the positive pule and widening the negative pulse in accordance with the thus obtained reference pulse and in consideration of the above-described dead time. The above-described calculation is performed for each of the phases U, V and W. Then, time T from the origin of period T0 of the triangular wave to the first transition point of the reference pulse, working time data T1 of the pulse for the upper arm and working time data T2 of the pulse for the lower arm are obtained. Furthermore, the above-described data, status data (positive or negative) of the upper pulse (or lower pulse) and the control signal are transferred to the pulse generating device. The above-described transfer is arranged to be performed at the timing defined in response to a countup signal transmitted in synchronization with the origin of the period of the above-described triangular wave.

When data has, as described above, been transferred to the pulse generating device, the up/down counter 16 starts its counting operation. The up/down counter 16 is reset by a countdown signal stored in the control register 1 at a timing which is the half time of the period TO so that it commences its counting operation. The calculation unit 8 is started in response to a calculation control signal 13 so as to obtain the time data DT1 and DT2 by a predetermined calculation procedure. Although a variety of methods can be employed to perform the above-described calculation, a method is employed according to this embodiment which is arranged such that the working time data T1 is added to the reference time data T and the time data DT1 is thereby obtained. Furthermore, the time data DT2 is obtained by subtracting the working time data T2 from the reference time data T. The thus obtained time data DT1 and DT2 are respectively transferred to the time data register 10 and 11 by the transfer control unit 9 in accordance with the place to which they are transferred and which are instructed with the transfer control signal 14 and the transference timing. It is preferable that the calculation unit 8 and the transfer control unit 9 be structured by a simple microprocessor. In this case, the above-described calculation process and the transference control can be performed in accordance with programs. As a result, the control signal given from the upper CPU can be simplified. However, the present invention is not limited to the above-described structure. It is apparent that the above-described calculation and the control of the data transference can be realized by a hardware.

When the time data DT1 and DT2 are stored in the time data registers 10 and 11, they are subjected to comparisons with the counted value made by the up/down counter 16 by the comparators 18 and 19. When they coincide with each other, the coincidence signals 20 and 21 are transmitted to the corresponding pulse output registers 5 and 6. As a result, the flip-flop of each of the pulse output registers 5 and 6 are set so that the output line 24 is converted to the positive polarity and the output line 25 is converted to the negative polarity via the output switches 22 and 23. The counter 16 is then switched to the countdown mode. When the counted value again coincides with the time data DT1 and DT2, the coincidence signals 20 and 21 are transmitted. As a result, the flip-flop of each of the pulse output registers 5 and 6 is reset so that the polarity of each of the output lines 24 and 25 is inverted. Therefore, the desired pulses (1) and (2) are obtained.

As described above, according to this embodiment, the pair of pulses which hold the complementary relationship and are composed of a positive pulse and a negative pulse, the width of which is larger than that of the positive pulse, are generated in such a manner that data items DT1 and DT2 are, by the calculation unit 8, obtained from the reference time data which defines the timing axis of the pair of the pulses and two working time data items showing their relationship. Furthermore, the thus obtained data items DT1 and DT2 and the counted value obtained from the up/down counter 16 are subjected to a comparison. As a result, the first and the last transition points of a pair of pulses are defined. Therefore, the number of time data items, which must be transferred from the upper CPU, can be reduced by one for each pair of pulses. Therefore, three transfer data items can be reduced in the case of a three-phase device.

Furthermore, the binary status of a pair of pulses is defined in such a manner that the two pulse output registers are arranged to have the complementary relationship. Therefore, the upper CPU must transfer only one status data item. Therefore, the number of the data items to be transferred can further be reduced by three in the case of the three-phase device.

In addition, since the dead time is calculated by the pulse generating device, the load applied to the upper CPU at the time of the above-described data transfer operation can be reduced. Furthermore, the load applied at the time of the calculation operation can be reduced.

Furthermore, since the up/down counter is employed in the structure, the first and the last transition points of the pulse can be defined by only one time data. Therefore, the calculation to be performed by the calculation unit 8 can be simplified.

In addition, the pulse output registers 5 and 6 have a pair of complementary output terminals and the binary status of the pulse can be selected by the output switches 22 and 23. Therefore, the present invention can be applied to pulse generating devices in addition to the devices for generating the switching pulse for the upper and the lower arms of the inverter. As a result, a significant wide range of general purposes can be obtained.

Figure 19:
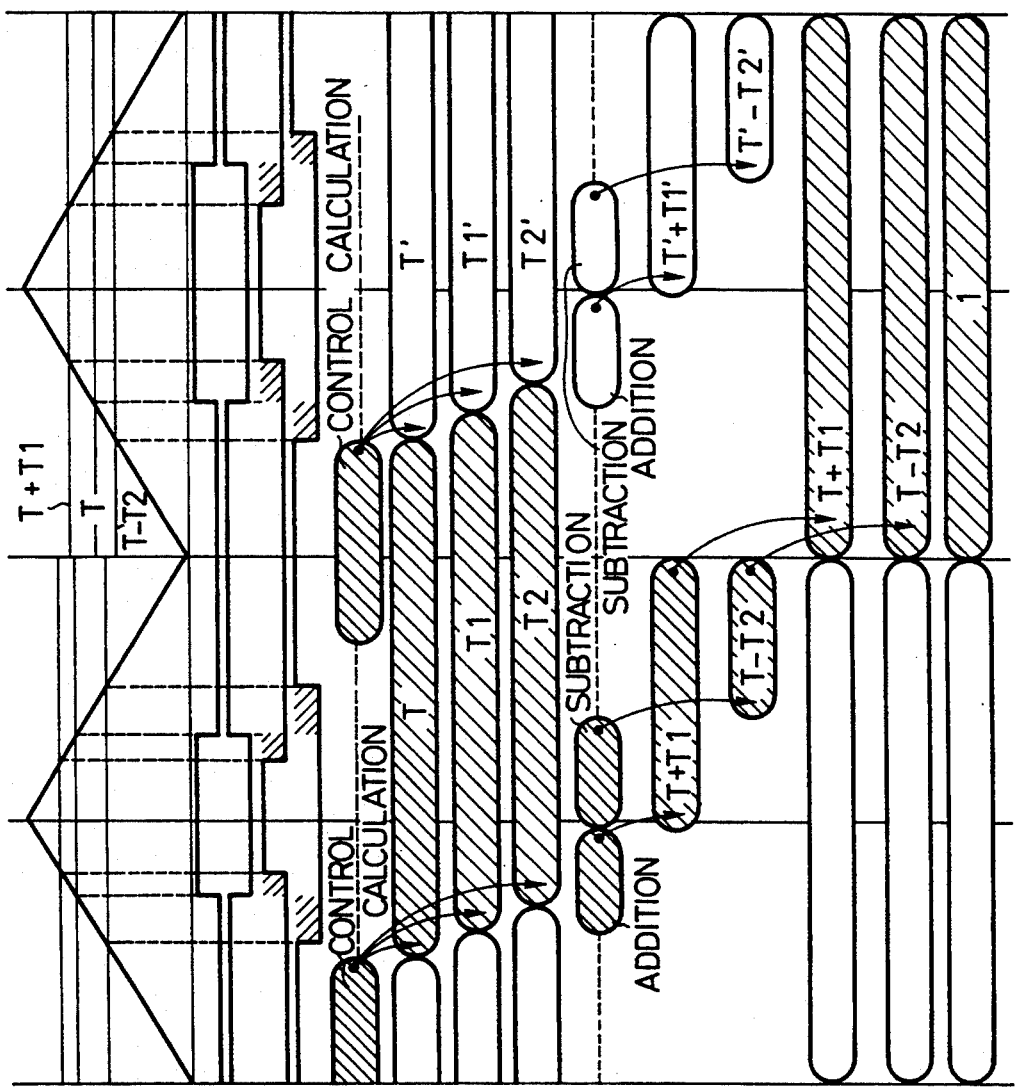
FIG. 19 is a timing chart which illustrates the operation of the structure shown in FIG. 18.
Figure 20:
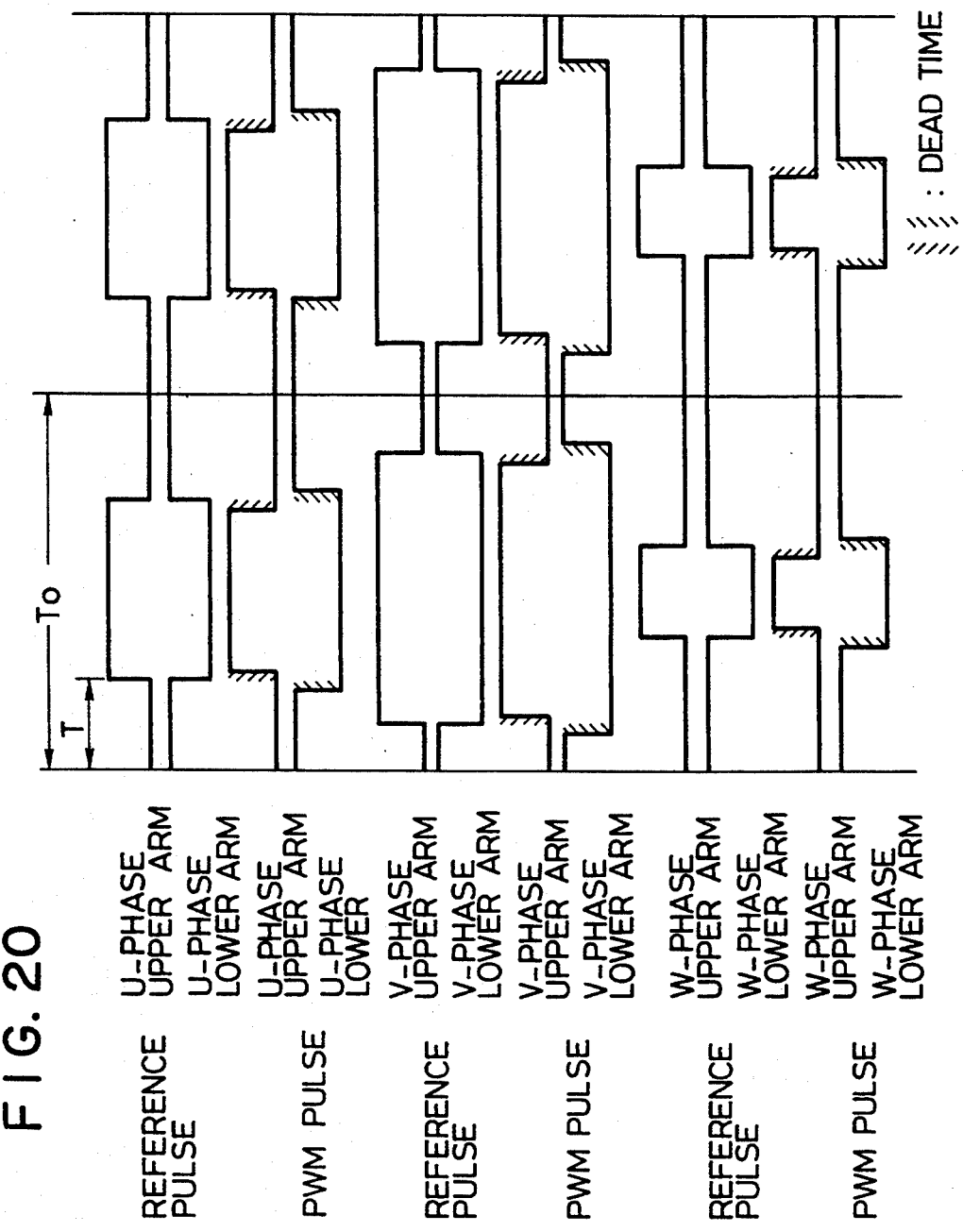
FIG. 20 is a timing chart for illustrating the PWM pulse.
Figure 21:
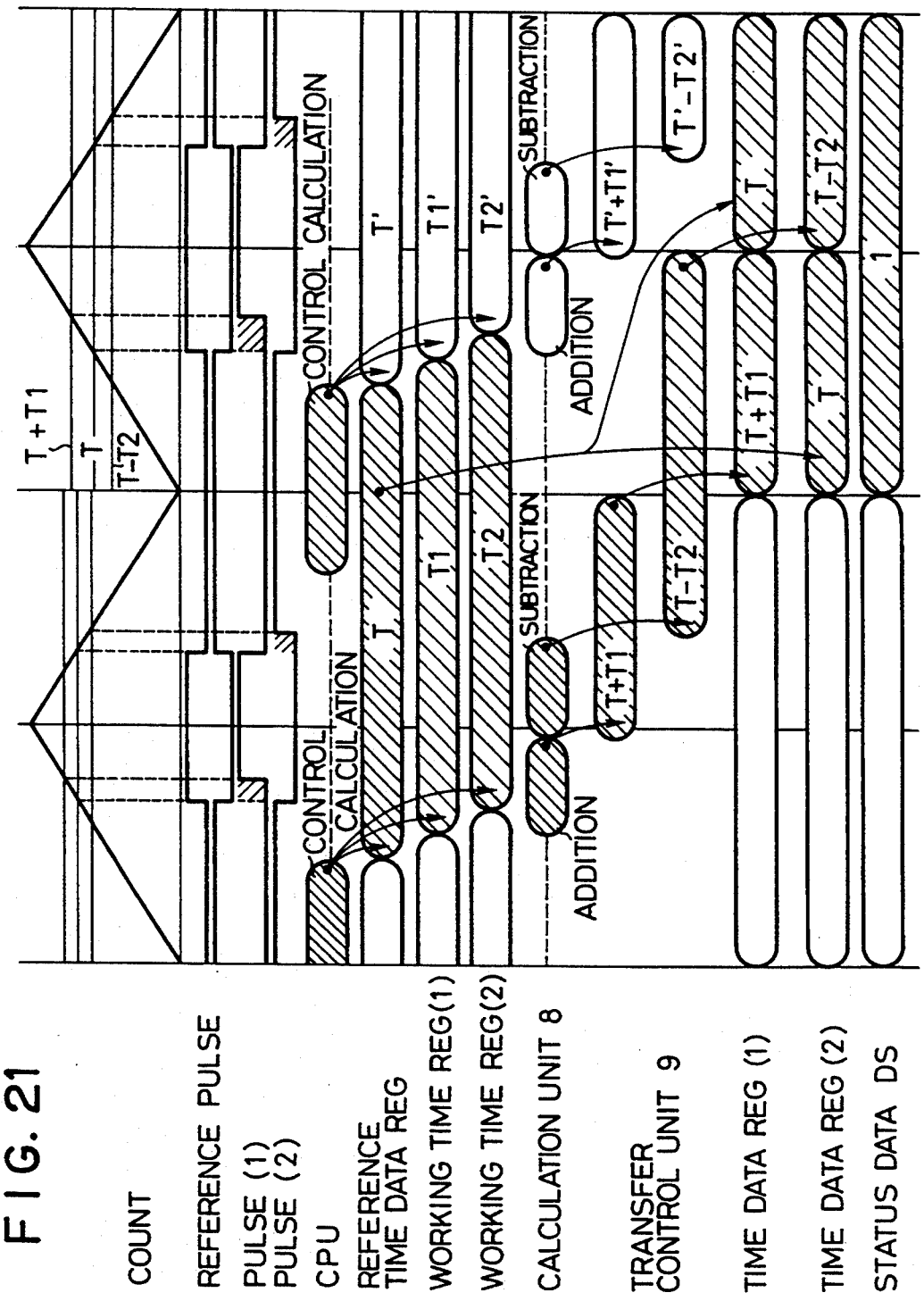
FIGS. 21, 22 and 23 are each time charts which respectively illustrate other embodiments of the pulse generation calculation methods.
Figure 22:
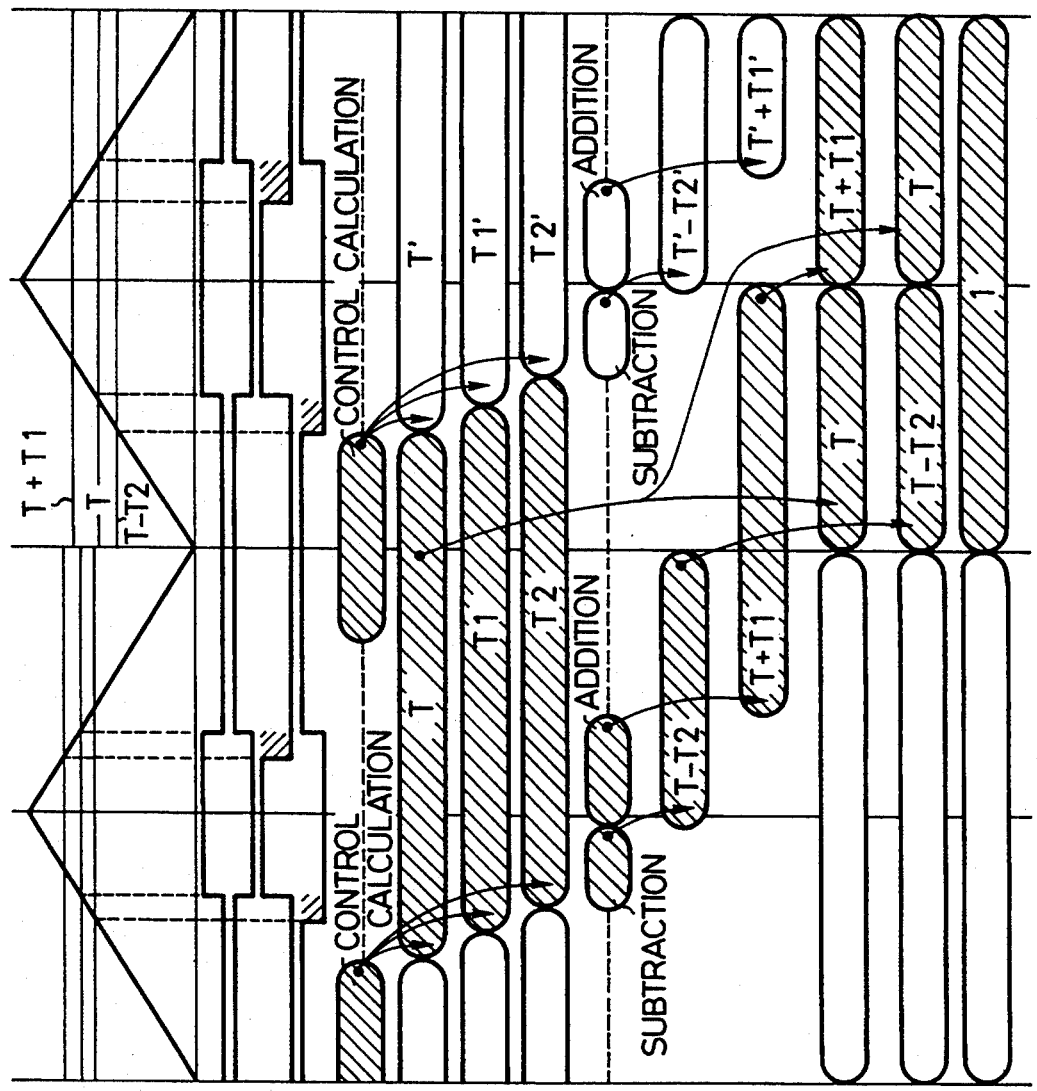
Figure 23:
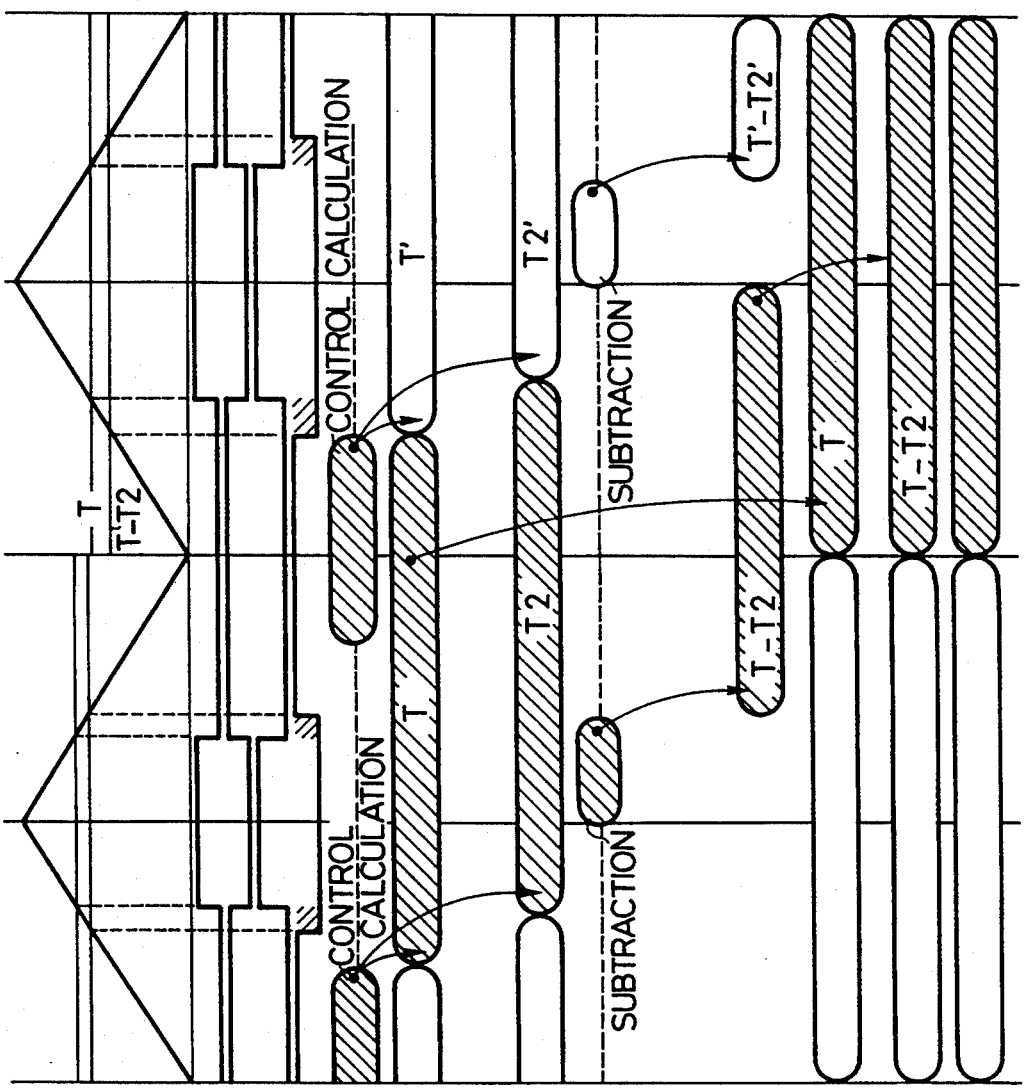

The method for determining the working time data for narrowing the positive pulse and widening the negative pulse in consideration of the above-described dead time can be modified as shown in FIGS. 21, 22 and 23 in addition to the embodiment shown in FIG. 19.

FIG. 21 illustrates a structure arranged in a manner such that only the first transition point of each of the positive pulse and the negative pulse is delayed with respect to the reference pulse so that a necessary dead time is provided. Therefore, the calculation unit 8 acts to obtain $T+T1$ and $T-T2$ similarly to the first embodiment. However, $T+T1$ and T are treated to form a set as the time data DT1 and T and $T-T2$ are treated to form a set as the time data DT2. The transference control unit 9 transfers $T+T1$ to the time data register 10 in synchronization with the countup signal and T to the time data register 11. Furthermore, the transference control unit 9 transfers T to the time data register 10 in synchronization with the count down signal and $T-T2$ to the time data register 11. As a result, the pulses (1) and (2) shown in the drawing are transmitted.

FIG. 22 illustrates a structure arranged in such a manner that only the last transition point of each of the positive and negative pulses is delayed with respect to the reference pulse so that a necessary dead time is provided.

FIG. 23 illustrates a structure arranged in such a manner that the positive pulse is caused to coincide with the reference pulse so that the last transition point of the negative pulse is shifted forward and the first transition point is delayed.

Figure 24:
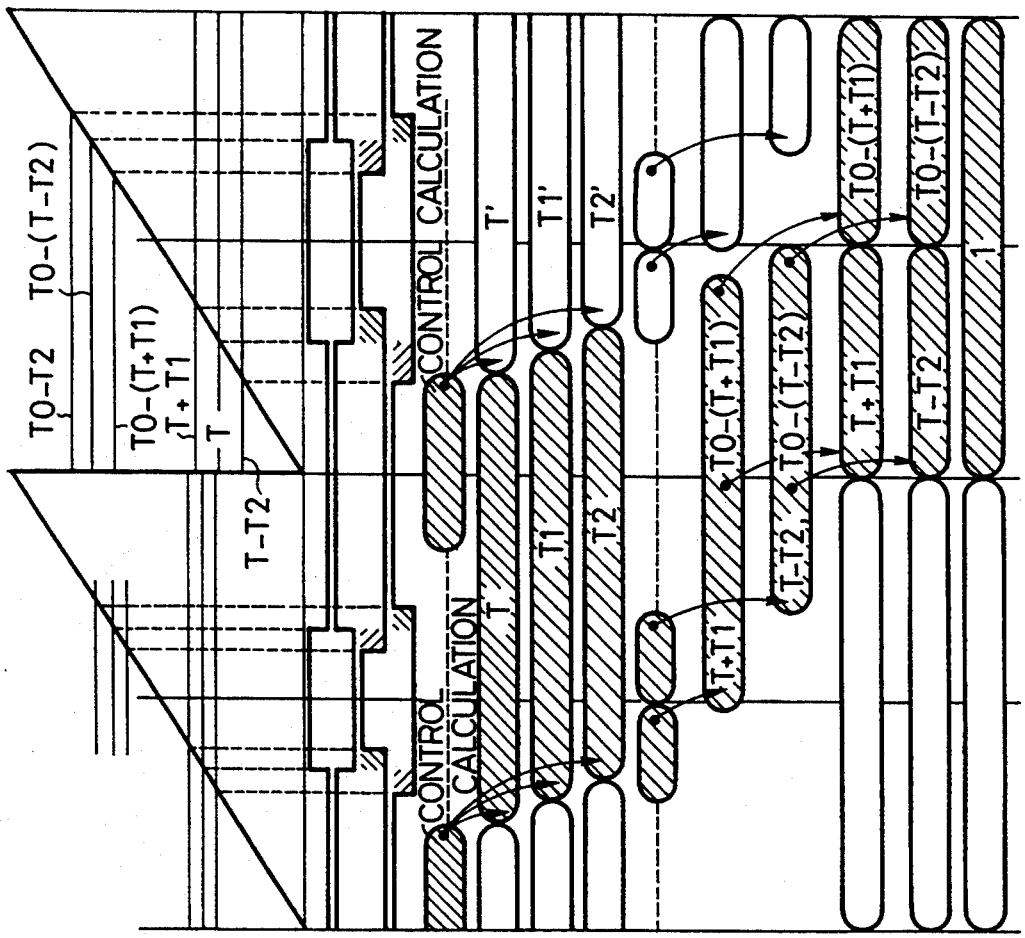
FIG. 24 is a timing chart which illustrates another embodiment of the pulse generating device of the present invention.

FIG. 24 is a timing chart for another embodiment of the present invention. The difference between this embodiment and the first embodiment lies in that the up/down counter 16 is replaced by a free-run counter. In accordance with this, the operation and function of the calculation unit 8 and the transfer control unit 9 are different from those according to the first embodiment. Then, the operation according to this embodiment will be described with reference to FIG. 24. FIG. 24 illustrates the pulses similarly to FIG. 19. Data transferred from the upper CPU is substantially the same as that shown in FIG. 19. The command given to the free-run counter is in the form of a reset signal which synchronizes with the period of the carrier wave. The transfer control unit 9 is arranged to receive the above-described reset signal and the transfer control signal 14 at a half time (which corresponds to the above-described countdown signal) of the period of the carrier signal. When each of the data items have been transferred, the calculation control unit 8 acts to obtain one set of $T+T1$ and $T0-(T+T1)$ as the time data DT1. Furthermore, it acts to obtain one set of $T-T2$ and $T0-(T-T2)$ as the time data DT2. Then, the calculation control unit 8 transfers the thus obtained time data to the time data registers 10 and 11 in accordance with the above-described transference timing, that is, the illustrated timing. As a result, the pulses (1) and (2) shown in FIG. 19 can be generated.

Although omitted from the illustration, this embodiment enables the pulse shown in the modifications shown in FIGS. 21, 22 and 23 to be generated.

As described above, according to the embodiment shown in FIG. 18, the following effect can be obtained.

That is, the time data consisting of the first and last transition points of the pair of pulses can be obtained by the calculation unit by using one reference time data item and the pair of working time data items. The thus obtained data items are stored in the pair of pulse output registers. When it has been determined by the comparator that the counted value coincides with the first transition time data, the output terminal of the first pulse output register is changed to the instructed binary status (positive or negative). Then, the same is reset when the counted data coincides with the last transition time data. The output terminal of the second pulse output register is operated in a manner contrary to the first pulse output register. As a result, a pair of pulses, having a pattern which is suitable to drive the switching device, operate the upper and lower arms in a complementary manner. Therefore, the number of time data items to be transferred to the upper CPU can be reduced by one for one phase. Therefore, the load applied to the upper CPU at the time of the data transference operation can be reduced. Furthermore, since the upper CPU is freed from the necessity of performing the calculation to control the time difference between the pair of pulses, its load can be reduced.

In addition, when the structure is arranged to comprise the up/down counter, the first and last transition points of the pulse can be controlled only by one time data item by causing the counter to perform the up-reset and down-reset operations in accordance with the period of the PWM carrier wave. Therefore, the process to be performed by the calculation unit can be reduced.

When the working time data about either of the pulses is made to coincide with the above-described reference time data, the reference time data register or the first working time data register can be omitted from the structure and one data item to be transferred can be reduced.

Furthermore, each of the above-described pulse output registers is arranged to have the inversion output terminal which is maintained at the inverted status of the above-described output terminal. Furthermore, an output switch for selecting either the output terminal of the above-described pulse output register or the inversion output terminal is provided. As a result, each of the switches is controlled in response to the output switch control signal to be stored in the above-described control register. Therefore, the polarity of the generated pulse is able to reveal a significantly wide general purpose capability.

Then, the structure of an embodiment in which the pulse generating device according to the present invention is used in a device for controlling an electric motor will be described with reference to FIGS. 25 and 26. According to this embodiment, the manner of providing the above-described dead time can be selected in accordance with the direction (polarity) of the load current passing through the electric motor. According to this embodiment, the operation of an electric motor 31 is controlled by a voltage type inverter 30. The voltage type inverter 30 has switching devices 34a, 34b, 35a and 35b which are switched on/off in response to a pulse transmitted from an inverter control device 33. The inverter control device 33 comprises a CPU and a pulse generating device. The pulse generating device generates the above-described pulse in accordance with control data supplied from the CPU. The inverter control device is arranged to receive load currents 38a, 38b and 38c of each phase and magnetic pole position signal of the electric motor and a rotational direction detection signal from the rotation detector 39.

Figure 26:
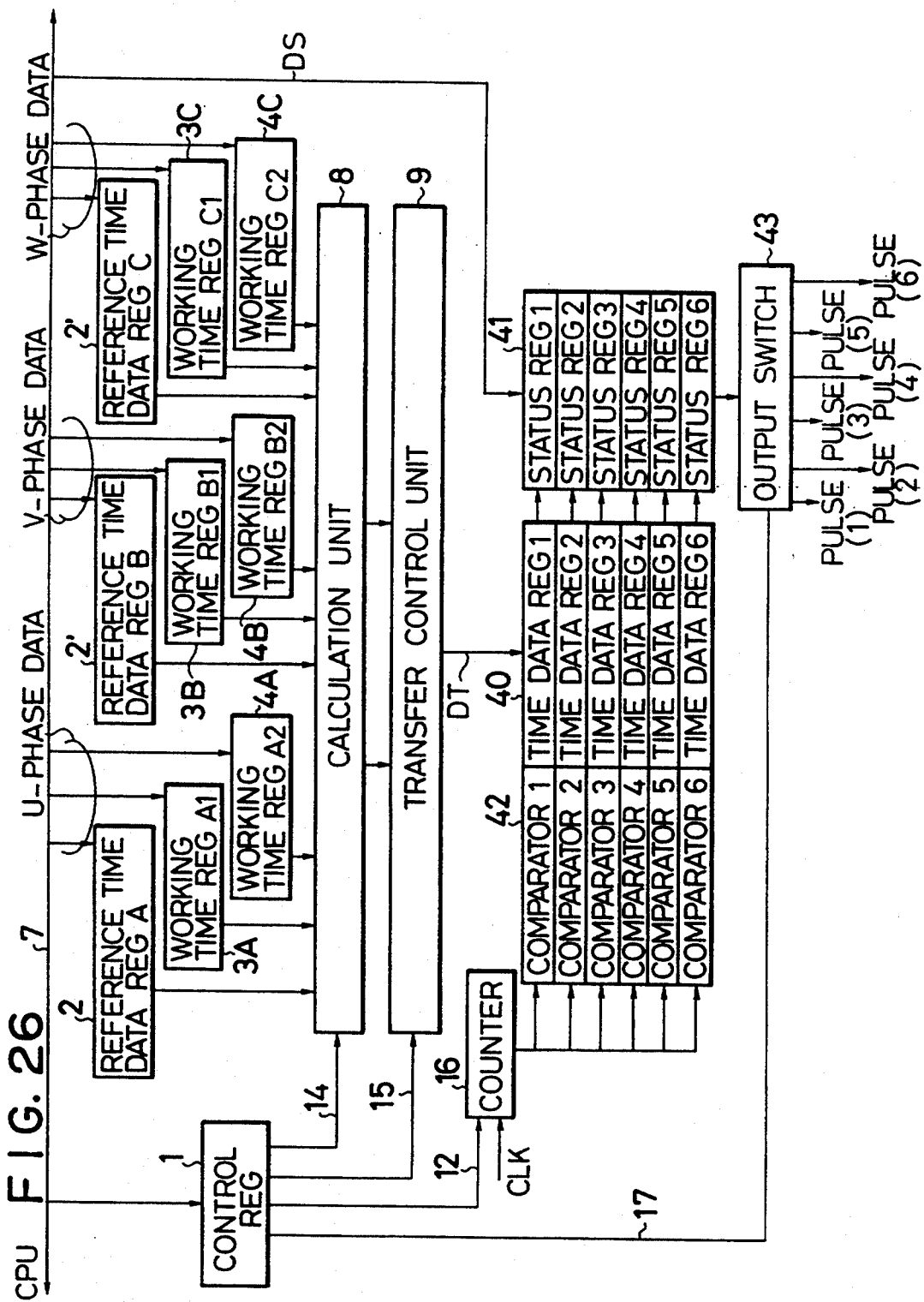
FIG. 26 illustrates an essential portion of the structure shown in FIG. 25.

FIG. 26 illustrates the structure of the pulse generating device 33. Since the method of generating the PWM pulse is common to each phase in the device according to this embodiment, the description is limited to only one phase. If either of the switches for the upper and lower arms is switched off and another switch is simultaneously switched on, the arm short cut takes place since a predetermined time is required for the arm to be switched on/off in the operation for controlling the electric motor in which the voltage type inverter device is used, as shown in FIG. 25. In order to prevent the short-cut of the arms, the dead time must be provided in which both the upper and lower arms are turned off. The inverter control device 33 fetches data about the motor current, the magnetic pole position and the rotational direction so as to cause its CPU to perform the calculations. The CPU calculates the speed of the electric motor so as to obtain reference time data T which is data about the duty of the pulse signal which corresponds to the deviation between the detected speed and the instructed speed. Furthermore, the CPU calculates the dead time data T1, the dead time data T2 and the status data DS which are necessary to generate the dead time. In addition, the CPU determines the direction of the current so as to generate the calculation control signal 13 which determines the data working method in the calculation unit 9, and the transfer control signal 14 which instructs the sequential order and timing of data transfer performed in the transfer control unit 9. Finally, the CPU causes the reference time data T to be stored in the reference time data register 2, the dead time data T1 to be stored in the working time register 3, the dead time data T2 to be stored in the working time register 4 and each of the control signals to be stored in the control register 1. The data stored in each of the registers is subjected to the addition and subtraction in the calculation unit 8 in accordance with the method indicated by the control signal.

The dead time is provided according to this embodiment by switching the three methods shown in FIGS. 19, 21 and 22. That is, the first method is arranged in such a manner that the first transition point of each of the pair of positive and negative pulses is delayed with respect to the reference pulse, while the last transition point of the same is shifted forward. The second method is arranged in such a manner that only the first transition point of each of the positive and negative pulses is delayed with respect to the reference pulse. The third method is arranged in such a manner that only the last transition point of each of the positive and negative pulses is shifted forward with respect to the reference pulse. The time data obtained from each of the above-described methods is transferred to the transfer control unit 9 so as to be further transferred to a time data REG 40 at the timing which is defined in response to the transfer control signal supplied from the CPU. The time data transferred to the time data REG 40 is immediately subjected to a comparison with the counted value made by the counter 16 in the comparator 42. At the time at which they coincide with each other, binary PWM pulses (1) to (6) are transmitted from the output switch 43 in accordance with the status data stored in a status data REG 41. As a result, the electric motor 31 is controlled.

Figure 27A:
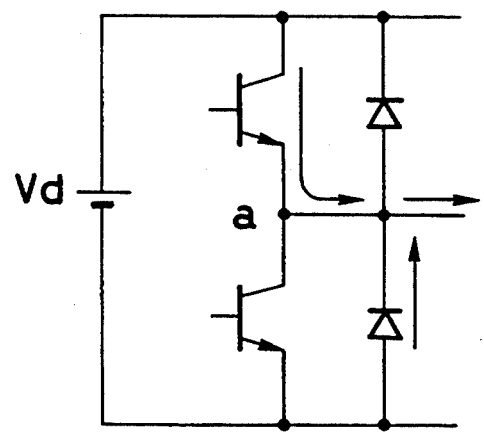
FIGS. 27A, 27B, 28A, and 28B each respectively illustrate the influence of the load current and the dead time upon the output voltage.
Figure 27B:
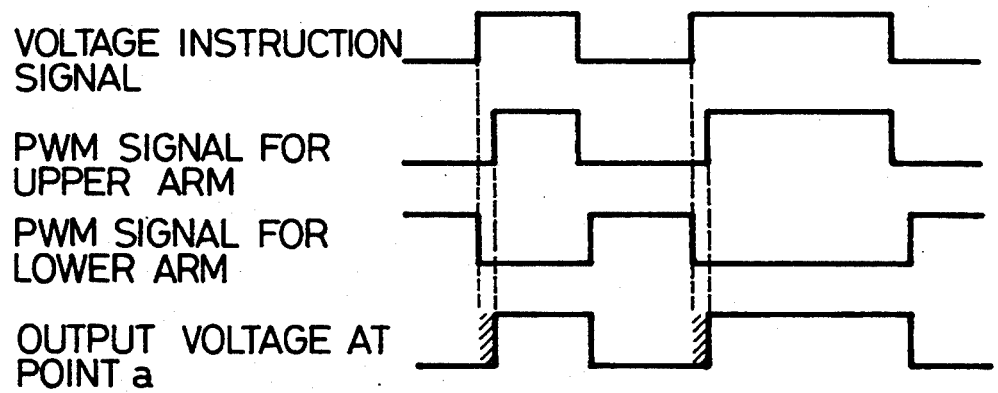
Figure 28A:
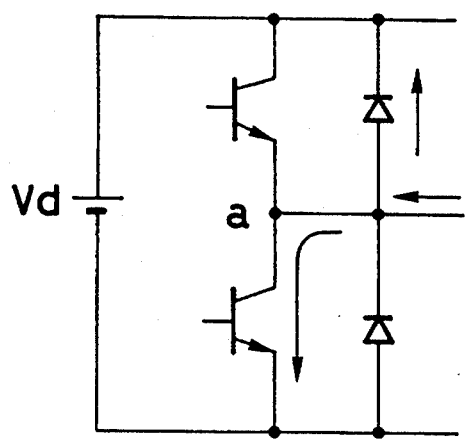
Figure 28B:
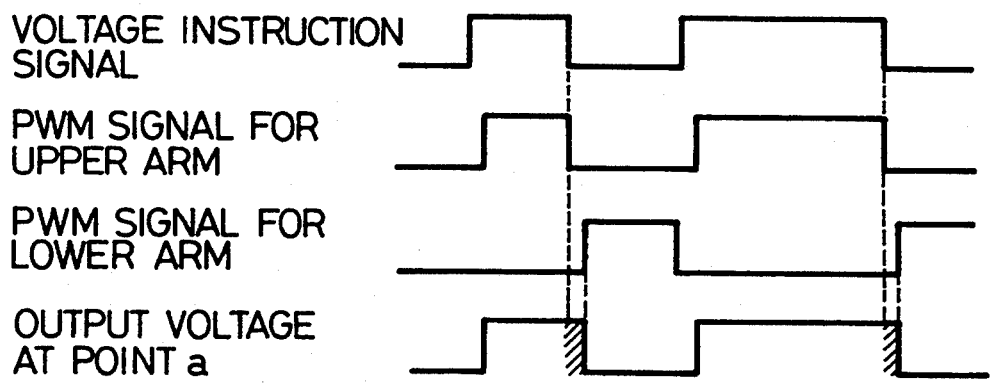

The output voltage in the dead time is changed due to the direction of the load current. For example, in a case where the load current passes toward the load as shown in FIG. 27 and in a case of the second method, the output voltage (point a) is reduced by quantity corresponding to the hatched section with respect to the reference pulse. On the other hand, in a case where the load current passes from the electric motor to the inverter, the output voltage is raised by a quantity corresponding to the hatched section with respect to the reference pulse. Therefore, if the dead time provision method is limited to one method, the above-described error voltage can be generated. As a result, a problem arises in that desired output voltage cannot be generated and the control accuracy deteriorates.

Accordingly, this embodiment is arranged in such a manner that the above-described three methods are switched in accordance with the direction of the load current. That is, the CPU determines the direction of the load current so as to select the method with which the above-described error voltage is not generated. Then, the calculation control signal is transmitted to the calculation control unit 8.

FIG. 29 is a time chart for the calculation performed by the CPU according to the embodiment shown in FIG. 26. The CPU of the inverter control device 33 fetches data about the electric current, the magnetic pole position and the rotational direction so as to perform the control calculation. In the control calculation, the speed of the electric motor, which is the subject to be controlled, is, as shown in FIG. 29, calculated so as to calculate the reference time data which is data for duty-defining the pulse signal corresponding to the deviation between the detected speed and the instructed speed (step 51). Then, the working time data T1 and T2 for generating the dead time for preventing the short cut of the upper and lower arms of the voltage type inverter 30 are generated. (step S52). Furthermore, the direction of the current is determined so as to generate the calculation control signal for determining the working method (step 53). The CPU causes the reference time data to be stored in the reference time data register 2, the working time data T1 and T2 to be stored in the working time data registers 3 and 4 and the control signal to be stored in the control register 1 (step 54). As a result, the time data for obtaining a desired PWM signal is generated by adding or subtracting the reference time data and the working time data T1 and T2 in the calculation unit 8 (step 55) so as to be transferred to the time data REG 1 to 6 (step 56). Therefore, according to this embodiment, the load to be applied to the CPU at the time of the calculation can be reduced by the function of the calculation unit 8.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A pulse generating device comprising a processor and pulse generating means, said processor includes:
    a reference time data register for storing reference time data for defining a timing axis of a pair of pulses to be generated,
    first and second working time data registers for storing respectively working time data showing a time difference between both pulses of said pair of pulses to be generated and said reference time data,
    a calculation unit for fetching said reference time data and said working time data, and for calculating time data on a first transition for both pulses of said pair of pulses and a last transition for both pulses of said pair of pulses, and
    a transfer control unit for controlling transference timing of said time data for both pulses of said pair of pulses obtained in said calculation unit;
    said pulse generating means including:
    first and second pulse output registers having storage means for storing respectively status data which is a binary digit to specify the binary digit status of either pulse of said pair of pulses to be generated and having output means for outputting an output pulse,
    a control register for storing a calculation control signal, a transfer control signal and a reset signal,
    a counter for counting clock pulses,
    first and second time data registers for storing respectively said time data for both pulses of said pair of pulses transmitted from said transfer control unit, and
    first and second comparators for comparing said time data of both of said time data registers with the value of said counter so as to transmit a coincidence signal when said compared values coincide with each other; wherein
    said calculation unit performs a calculation defined in response to said calculation control signal stored in said control register,
    said transfer control unit controls said transference timing of each of said time data in response to said transfer control signal stored in said control register,
    said output means of said first pulse output register outputs said output pulse corresponding to a binary digit that is the same state as said status data when one coincidence signal is supplied from a corresponding comparator, and said output pulse corresponding to a binary digit that is reset to the complement of said status data when a next coincidence signal is supplied,
    said output means of said second pulse output register outputs said output pulse corresponding to an inverse binary digit that is the complement of said status data when one coincidence signal is supplied from a corresponding comparator, and said output pulse corresponding to an inverse binary digit that is reset to the same state as said status data when the next coincidence signal is supplied,
    said counter is reset in response to said reset signal periodically stored in said control register, and
    said reference time data, each of said working time data and said status data are supplied in synchronism with said reset signal from another processor.

2. A pulse generating device according to claim 1, wherein both of said pulse output registers has an inversion output terminal maintained at an inverted status of said output terminal.

3. A pulse generating device according to claim 1, wherein output switches for selecting either of said output terminals of each of said pulse output registers and said inversion output terminal are provided, and each of said switches is controlled in response to an output switch control signal stored in said control register.

4. A pulse generating device according to claim 1, wherein said counter is a free-run counter.

5. A pulse generating device according to claim 4, wherein said calculation unit obtains the 1A th time data by adding said first working time data to said reference time data, the 1B th time data by subtracting said 1A th time data from the period of said reset signal, the 2A th time data by subtracting said 2A th time data from said reference time data and the 2B th time data by subtracting the 2A th time data from the period of said reset signal and said transfer control unit transfers said 1A th and 2A th time data to said first and second time data registers in response to said reset signal, and transfers said 1B th and 2B th time data to said first and second time data registers in accordance with a half period of said reset signal.

6. A pulse generating device according to claim 4, wherein said calculation unit obtains the 1A th time data by adding said first working time data to said reference time data, the 1B th time data by subtracting said reference time data from the period of said reset signal and the 2B th time data by subtracting the sum of said reference time data and said second working time data from said period of said reset signal and said transfer control unit transfers said 1A th time data and said reference time data to said first and second time data registers and transfers said 1B th time data and said 2B th time data to said first and second time data registers in accordance with a half period of said reset signal.

7. A pulse generating device according to claim 4, wherein said calculation unit obtains the 1B th time data by subtracting the sum of said reference time data and said first working time data from said period of said reset signal, the 2A th time data by subtracting said second working time data from said reference time data and the 2B th time data by subtracting said reference time data from said period of said reset signal, and said transfer control unit transfers said reference time data and said 2A th time data to said first and second time data registers in response to said reset signal and transfers said 1B th and 2B time data to said first and second time data registers in accordance with a half period of said reset signal.

8. A pulse generating device according to claim 1, wherein said counter is an up/down counter and said reset signal of said counter is a countup signal and a countdown signal which are alternately supplied at a predetermined period.

9. A pulse generating device according to claim 8, wherein said calculation unit obtains first time data by adding said first working time data to said reference time data, second time data by subtracting said second working time data from said reference time data, and said transfer control unit transfers said first and second time data to said first and second time data registers.

10. A pulse generating device according to claim 8, wherein said calculation unit obtains first time data by adding said first working time data to said reference time data, second time data by subtracting said second working time data from said reference time data, and said transfer control unit transfers said first time data and said reference time data to said first and second time data registers in synchronization with said countup signal and transfers said reference time data and second time data to said first and second time data registers in synchronization with said countdown signal.

11. A pulse generating device according to claim 8, wherein said calculation unit obtains first time data by adding said first working time data to said reference time data, second time data by subtracting said second working time data from said reference time data, and said transfer control unit transfers said reference time data and said second time data to said first and second time data registers in synchronization with said countup signal and transfers said first time data and said reference time data to said first and second time data registers in synchronization with said countdown signal.

12. A pulse generating device comprising a processor and pulse generating means, said processor includes:
a reference time data register for storing reference time data for defining a timing axis for a pair of pulses to be generated,
first and second working time data registers for storing respectively working time data showing a time difference between both pulses of said pair of pulses to be generated and said reference time data,
a calculation unit for fetching said reference time data and said working time data, and for calculating time data on a first transition for both pulses of said pair of pulses and a last transition for both pulses of said pair of pulses, and
a transfer control unit for controlling transference timing of said time data for both pulses of said pair of pulses obtained in said calculation unit;
said pulse generating means including:
first and second pulse output registers having storage means for storing respectively status data which is a binary digit of either pulse of said pair of pulses to be generated and having output means for outputting an output pulse,
a control register for storing a calculation control signal, a transfer control signal and a reset signal,
a counter for counting clock pulses,
first and second time data registers for storing respectively said time data for both pulses of said pair of pulses transmitted from said transfer control unit, and
first and second comparators for comparing respectively said time data of both of said time data registers with the value of said counter so as to transmit a coincidence signal when said compared values coincide with each other; wherein
said calculation unit performs a calculation defined in response to said calculation control signal stored in said control register,
said transfer control unit controls said transference timing of each of said time data in response to said transfer control signal stored in said control register,
said output means of both of said pulse output registers respectively outputs said output pulse corresponding to an inverse binary digit that is the complement of said status data when one coincidence signal is supplied from a corresponding comparator, and said output pulse corresponding to an inverse binary digit that is reset to the same state as said status data when a next coincidence signal is supplied,
said counter is reset in response to said reset signal periodically stored in said control register, and
said reference time data, each of said working time data and said status data are supplied in synchronism with said reset signal from another processor.

13. A pulse generating device according to claim 12, wherein output switches for selecting either of said output terminals of each of said pulse output registers and said inversion output terminal are provided, and each of said switches is controlled in response to an output switch control signal stored in said control register.

14. A pulse generating device according to claim 12, wherein said counter is a free-run counter.

15. A pulse generating device according to claim 14, wherein said calculation unit obtains the 1A th time data by adding said first working time data to said reference time data, the 1B th time data by subtracting said 1A th time data from the period of said reset signal, the 2A th time data by subtracting said 2A th time data from said reference time data and the 2B th time data by subtracting the 2A th time data from the period of said reset signal and said transfer control unit transfers said 1A th and 2A th time data to said first and second time data registers in response to said reset signal, and transfers said 1B th and 2B th time data to said first and second time data registers in accordance with a half period of said reset signal.

16. A pulse generating device according to claim 14, wherein said calculation unit obtains the 1A th time data by adding said first working time data to said reference time data, the 1B th time data by subtracting said reference time data from the period of said reset signal and the 2B th time data by subtracting the sum of said reference time data and said second working time data from said period of said reset signal and said transfer control unit transfers said 1A th time data and said reference time data to said first and second time data registers and transfers said 1B th time data and said 2B th time data to said first and second time data registers in accordance with a half period of said reset signal.

17. A pulse generating device according to claim 14, wherein said calculation unit obtains the 1B th time data by subtracting the sum of said reference time data and said first working time data from said period of said reset signal, the 2A th time data by subtracting said second working time data from said reference time data and the 2B th time data by subtracting said reference time data from said period of said reset signal, and said transfer control unit transfers said reference time data and said 2A th time data to said first and second time data registers in response to said reset signal and transfers said 1B th and 2B time data to said first and second time data registers in accordance with a half period of said reset signal.

18. A pulse generating device according to claim 12, wherein said counter is an up/down counter and said reset signal of said counter is a countup signal and a countdown signal which are alternately supplied at a predetermined period.

19. A pulse generating device according to claim 18, wherein said calculation unit obtains first time data by adding said first working time data to said reference time data, second time data by subtracting said second working time data from said reference time data, and said transfer control unit transfers said first and second time data to said first and second time data registers.

20. A pulse generating device according to claim 18, wherein said calculation unit obtains first time data by adding said first working time data to said reference time data, second time data by subtracting said second working time data from said reference time data, and said transfer control unit transfers said first time data and said reference time data to said first and second time data registers in synchronization with said countup signal and transfers said reference time data and second time data to said first and second time data registers in synchronization with said countdown signal.

21. A pulse generating device according to claim 18, wherein said calculation unit obtains first time data by adding said first working time data to said reference time data, second time data by subtracting said second working time data from said reference time data, and said transfer control unit transfers said reference time data and said second time data to said first and second time data registers in synchronization with said countup signal and transfers said first time data and said reference time data to said first and second time data registers in synchronization with said countdown signal.

22. A pulse generating device comprising a processor and pulse generating means, said processor includes:
a reference time data register for storing reference time data for defining a timing axis of either of a pair of pulses to be generated,
working time data register for storing working time data showing a time difference between either pulse of said pair of pulses to be generated and another pulse,
a calculation unit for fetching said reference time data and said working time data, and for calculating time data on a first transition for both pulses of said pair of pulses and a last transition for both pulses of said pair of pulses, and
a transfer control unit for controlling transference timing of said time data for both pulses of said pair of pulses obtained in said calculation unit;
said pulse generating means including:
first and second pulse output registers having storage means for storing respectively status data which is a binary digit to specify the binary digit status of said either pulse of said pair of pulses to be generated, and having output means for outputting an output pulse,
a control register for storing a calculation control signal, a transfer control signal and a reset signal,
a counter for counting clock pulses,
first and second time data registers for storing respectively said time data for both pulses of said pair of pulses transmitted from said transfer control unit, and
first and second comparators for comparing respectively said time data of both of said time data registers with the value of said counter so as to transmit a coincidence signal when said compared values coincide with each other; wherein
said calculation unit performs a calculation defined in response to said calculation control signal stored in said control register,
said transfer control unit controls said transference timing of each of said time data in response to said transfer control signal stored in said control register,
said output means of said first pulse output register outputs said output pulse corresponding to an inverse binary digit that is the complement of said status data when one coincidence signal is supplied from a corresponding comparator, and said output pulse corresponding to an inverse binary digit that is reset to the same state as said status data when a next coincidence signal is supplied,
said output means of said second pulse output register outputs said output pulse corresponding to an inverse binary digit that is the complement of said status data when the one coincidence signal is supplied from a corresponding comparator, and said output pulse corresponding to an inverse binary digit that is reset to the same state as said status data when the next coincidence signal is supplied,
said counter is reset in response to said reset signal periodically stored in said control register, and
said reference time data, each of said working time data and said status data are supplied in synchronism with said reset signal from another processor.

23. A pulse generating device according to claim 22, wherein both of said pulse output registers has an inversion output terminal which is maintained at the inverted status of said output terminal.

24. A pulse generating device according to claim 22, wherein output switches for selecting either of said output terminals of each of said pulse output registers and said inversion output terminal are provided, and each of said switches is controlled in response to an output switch control signal stored in said control register.

25. A pulse generating device according to claim 22, wherein said counter is a free-run counter.

26. A pulse generating device according to claim 22, wherein said counter is an up/down counter and said reset signal of said counter is a countup signal and a countdown signal which are alternately supplied at a predetermined period.

27. A pulse generating device according to claim 26, wherein said calculation unit makes said reference time data to be first time data and obtains second time data by subtracting said working time data from said reference time data, and said transfer control unit transfers said first and second time data to said first and second time data registers.

28. A pulse generating device comprising a processor and pulse generating means, said processor includes:
   a reference time data register for storing reference time data for defining a timing reference of either of a pair of pulses to be generated,
   a working time data register for storing working time data showing a timing difference between said either pulse of said pair of pulses to be generated and another pulse,
   a calculation unit for fetching said reference time data and said working time data, and for calculating time data on a first transition for both pulses of said pair of pulses and a last transition for both pulses of said pair of pulses, and
   a transfer control unit for controlling transference timing of said time data for both pulses of said pair of pulses obtained in said calculation unit;
   said pulse generating means including:
      first and second pulse output registers having storage means for storing respectively status data which is a binary digit to specify the binary digit status of said either pulse of said pair of pulses, and having output means for outputting an output pulse,
      a control register for storing a calculation control signal, a transfer control signal and a reset signal,
      a counter for counting clock pulses,
      first and second time data registers for storing respectively said time data for both pulses of said pair of pulses transmitted from said transfer control unit, and
      first and second comparators for comparing respectively said time data for both of said time data registers with the value of said counter so as to transmit a coincidence signal when said compared values coincide with each other; wherein
   said calculation unit performs a calculation defined in response to said calculation control signal stored in said control register,
   said transfer control unit controls said transference timing of each of said time data in response to said transfer control signal stored in said control register,
   said output means of both of said pulse output registers respectively outputs said output pulse corresponding to an inverse binary digit that is the complement of said status data when one coincidence signal is supplied from a corresponding comparator, and said output pulse corresponding to an inverse binary digit that is reset to the same state as said status data when a next coincidence signal is supplied,
   said counter is reset in response to said reset signal periodically stored in said control register, and
   said reference time data, each of said working time data and said status data are supplied in synchronism with said reset signal from another processor.

29. A pulse generating device according to claim 28, wherein each of said pulse output registers has an inversion output terminal which is maintained at the inverted status of said output terminal.

30. A pulse generating device according to claim 28, wherein output switches for selecting either of said output terminals of each of said pulse output registers and said inversion output terminal are provided, and each of said switches is controlled in response to an output switch control signal stored in said control register.

31. A pulse generating device according to claim 28, wherein said counter is a free-run counter.

32. A pulse generating device according to claim 28, wherein said counter is an up/down counter and said reset signal of said counter is a countup signal and a countdown signal which are alternately supplied at a predetermined period.

33. A pulse generating device according to claim 32, wherein said calculation unit makes said reference time data to be first time data and obtains second time data by subtracting said working time data from said reference time data and said transfer control unit transfers said first and second time data to said first and second time data registers.

* * * * *